United States Patent
Ravella et al.

(10) Patent No.: US 12,400,547 B2
(45) Date of Patent: Aug. 26, 2025

(54) STEERING LATERAL PRECISION CONTROL COMBINING INFRASTRUCTURE AND VEHICLE INTELLIGENCE

(71) Applicant: PlusAI, Inc., Santa Clara, CA (US)

(72) Inventors: Siva Bhargav Ravella, San Jose, CA (US); Amit Kumar, Sunnyvale, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/912,574

(22) Filed: Oct. 10, 2024

(65) Prior Publication Data

US 2025/0121883 A1   Apr. 17, 2025

Related U.S. Application Data

(60) Provisional application No. 63/636,090, filed on Apr. 18, 2024, provisional application No. 63/544,425, filed on Oct. 16, 2023.

(51) Int. Cl.
*B62D 15/02* (2006.01)
*B60W 30/02* (2012.01)
(Continued)

(52) U.S. Cl.
CPC .............. *G08G 1/22* (2013.01); *B60W 30/02* (2013.01); *B60W 30/16* (2013.01); *B60W 30/18159* (2020.02); *B60W 40/068* (2013.01); *B60W 50/0097* (2013.01); *B60W 60/001* (2020.02); *B60W 60/0015* (2020.02); *B60W 60/0027* (2020.02); *B62D 15/0265* (2013.01); *G05D 1/43* (2024.01); *G07C 5/008* (2013.01); *G08G 1/0129* (2013.01); *G08G 1/0141* (2013.01); *G08G 1/052* (2013.01); *G08G 1/096725* (2013.01);
(Continued)

(58) Field of Classification Search
CPC .......... B62D 15/0265; B60W 60/0015; B60W 2552/00; B60W 2556/45; B60W 2756/10; G08G 1/0141; G08G 1/164
See application file for complete search history.

(56) References Cited

U.S. PATENT DOCUMENTS 11,565,699 B1 *  1/2023  Ravella ........... B60W 30/18127
11,654,938 B1 *  5/2023  Kumar .............. B60W 60/0053
                                                                701/23
(Continued)

*Primary Examiner* — Peter D Nolan
*Assistant Examiner* — Wae L Louie
(74) *Attorney, Agent, or Firm* — Morgan, Lewis & Bockius LLP

(57) ABSTRACT

This application is directed to improving vehicle steering control of an autonomous vehicle. A first vehicle includes a first sensor, one or more processors, and memory. The first vehicle acquires, from at least the first sensor, first data of one or more first objects in a vicinity of the first vehicle. The first vehicle receives from a computer system associated with a fixed installation having at least a second sensor, via a wireless network, second data corresponding to one or more second objects detected by at least the second sensor. The first vehicle adjusts, by the one or more processors, a steering behavior of the first vehicle according to the first data and the second data. The first vehicle at least partially autonomously drives the vehicle in a first trajectory along the first lane of the road according to the steering behavior of the first vehicle.

20 Claims, 15 Drawing Sheets

(51) Int. Cl.
  B60W 30/16    (2020.01)
  B60W 30/18    (2012.01)
  B60W 40/068   (2012.01)
  B60W 50/00    (2006.01)
  B60W 60/00    (2020.01)
  G05D 1/43     (2024.01)
  G07C 5/00     (2006.01)
  G08G 1/00     (2006.01)
  G08G 1/01     (2006.01)
  G08G 1/052    (2006.01)
  G08G 1/0967   (2006.01)
  G08G 1/16     (2006.01)

(52) U.S. Cl.
  CPC ....... *G08G 1/096766* (2013.01); *G08G 1/164* (2013.01); *G08G 1/20* (2013.01); *B60W 2420/403* (2013.01); *B60W 2420/408* (2024.01); *B60W 2420/54* (2013.01); *B60W 2552/00* (2020.02); *B60W 2552/10* (2020.02); *B60W 2552/35* (2020.02); *B60W 2552/40* (2020.02); *B60W 2554/802* (2020.02); *B60W 2554/804* (2020.02); *B60W 2555/20* (2020.02); *B60W 2556/45* (2020.02); *B60W 2556/50* (2020.02); *B60W 2756/10* (2020.02)

(56) References Cited

U.S. PATENT DOCUMENTS

| | | | |
|---|---|---|---|
| 11,919,514 B1* | 3/2024 | Ravella | B60W 60/001 |
| 2017/0369055 A1* | 12/2017 | Saigusa | G08G 1/096775 |
| 2019/0019413 A1* | 1/2019 | Yun | B60W 60/0053 |
| 2019/0064801 A1* | 2/2019 | Frazzoli | G05D 1/81 |
| 2020/0064846 A1* | 2/2020 | Chen | G08G 1/096791 |
| 2020/0290638 A1* | 9/2020 | Damnjanovic | G08G 1/164 |
| 2021/0065547 A1* | 3/2021 | Ran | G08G 1/0145 |
| 2022/0126878 A1* | 4/2022 | Moustafa | B60W 40/09 |
| 2022/0161823 A1* | 5/2022 | Domeyer | G06N 3/08 |
| 2022/0242415 A1* | 8/2022 | Nice | B60W 40/04 |
| 2022/0363291 A1* | 11/2022 | Iwamoto | G05D 1/0038 |
| 2023/0131659 A1* | 4/2023 | Banach | G08G 1/096783 701/1 |
| 2024/0124060 A1* | 4/2024 | Giordano | B60W 30/0953 |
| 2024/0359739 A1* | 10/2024 | Kumar | B62D 5/0463 |

* cited by examiner

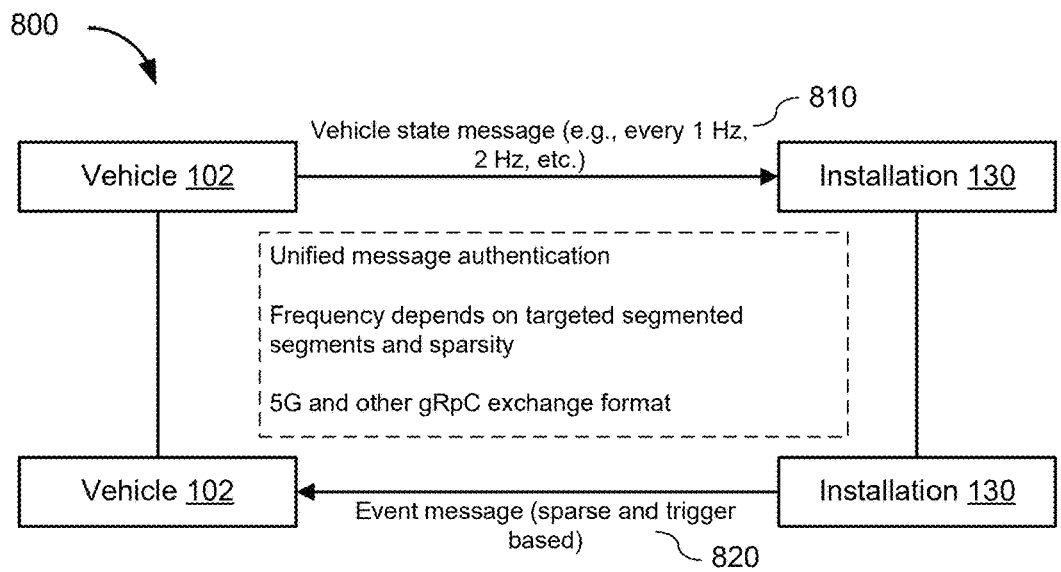

Figure 8

```
message LaneSegmentInfo {
    optional uint32 lane_id = 1;
    optional uint32 segment_id = 2;
    optional double start_s = 3;
    optional double end_s = 4;
    optional double curvature = 5;
    optional double avg_speed = 6;
    optional double avg_lateral_offset = 7;
    optional double avg_heading = 8;
    optional double avg_yawrate = 9;
} message InfraEventMessage {
    // Tracking and security sync information
    SyncMessage header = 1;

// Road segment information
    repeated LaneSegmentInfo segments = 2;
    // Traffic light information
    repeated TrafficLight traffic_lights = 3;
    // Stop Sign and speed information
    repeated Sign road_signs = 4;
}
```

Figure 9

```
1000 message VehicleState {
    // Tracking and security sync information
    SyncMessage header = 1;

// Ego vehicle Spatial information
    SpatialLocation spatial_info = 2;
    // ADS status information (healthy, fault, etc.)
    ADSStatus status = 3;
    // Total number of lanes on road; it is -1 when lane
information is not available
    int32 total_lanes = 4;
    // Ego lane index, 0 labels the leftmost lane; it is -1
when lane information is not available
    int32 current_lane = 5;
}
```

1336 Adjust, by the one or more processors, a steering behavior of the first vehicle according to the first data and the second data 1338 Determine, from the one or more categories of the status information, a first category of the status information that matches the first data of the one or more vehicles acquired from at least the first sensor 1340 Control a steering control model of the first vehicle to at least partially autonomously drive the first vehicle in a tracking-based mode or a stability-based mode 1342 Modify a parameter of a steering model of the first vehicle 1344 At least partially autonomously driving the first vehicle in a first trajectory along the first lane of the road according to the steering behavior of the first vehicle 1346 The first vehicle is configured to at least partially autonomously drive the first vehicle in the first trajectory in accordance with a determination, by the first vehicle, that the first vehicle can track the first travel trajectory 1348 In accordance with a determination that the first vehicle cannot track the first travel trajectory: reject the first travel trajectory and control the first vehicle to at least partially autonomously drive the first vehicle according to a second travel trajectory that is different from the first travel trajectory 1350 At least partially autonomously driving the first vehicle according to the second travel trajectory includes switching from a first lane of the road to a second lane of the road

Figure 13C

STEERING LATERAL PRECISION CONTROL COMBINING INFRASTRUCTURE AND VEHICLE INTELLIGENCE

RELATED APPLICATIONS

This application claims priority to (i) U.S. Provisional Application No. 63/544,425, filed Oct. 16, 2023, titled "Motion Controlling for Autonomous Vehicles" and (ii) U.S. Provisional Application No. 63/636,090, filed Apr. 18, 2024, titled "Centralized Prediction and Planning Using V2X for Lane Platooning and Intersection Vehicle Behavior Optimizations and Lane Change Decision-Making by Combining Infrastructure and Vehicle Intelligence," each of which is hereby incorporated by reference herein in its entirety.

This application is related to the following applications, all of which are incorporated by reference herein in their entireties:

U.S. patent application Ser. No. 18/912,576, filed Oct. 10, 2024, titled "Centralized Prediction and Planning for Improving Lane Platooning and Intersection Vehicle Behavior"; and U.S. patent application Ser. No. 18/912,577, filed Oct. 10, 2024, titled "Improved Motion Tracking for Autonomous Vehicle Driving."

TECHNICAL FIELD

The present application generally relates to vehicle technology, and more particularly to, methods, systems, and non-transitory computer readable storage media for collecting vehicle traffic data that can be used onboard or offboard to improve steering control in autonomous vehicles.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads, (2) more predictable and safer driving behavior than human driven vehicles, (3) less emissions if there are fewer vehicles on the road, and if they are electrically powered, (4) improved travel efficiency, fuel economy, and traffic safety if they are controlled by computers, (5) increased lane capacity, (6) shorter travel times, and (7) increased mobility for users who are incapable of diving.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving.

One of the key obstacles facing the autonomous vehicle industry is controlling the steering behavior of autonomous vehicles. Autonomous vehicles include steering control models (e.g., steering control systems) that steer the vehicles when they are in motion and make decisions when the vehicles turning. The steering model is designed considering tradeoffs among factors such as accuracy of control and smoothness of steering. It is extremely challenging to have optimal performance in all scenarios using one unified steering model. For example, a steering model that emphasizes smoothness often leads to late response in sharp curves, whereas a steering model that prioritizes high accuracy tends to cause oscillations in a vehicle due to noise that is triggered when the vehicle travels on a straight road.

Currently, autonomous vehicles are equipped with sensors that are primarily used for object (e.g., obstacle) detection. Steering control models are applied to determine existing road and traffic conditions based on large amounts of data collected from individual vehicles. However, perception of each individual vehicle is primarily based on the data that are collected by its own sensors and can only cover objects within a limited range. It would be beneficial to have a mechanism to provide supplementary information to improve the vehicles' control of their steering behavior.

SUMMARY

Some embodiments of the present disclosure are directed to methods, systems, and non-transitory computer readable storage media for steering control adjustment to facilitate autonomous vehicle driving. In accordance with some embodiments of this application is a realization that sensors positioned on installations (e.g., an infrastructure) that are situated along a road can provide supplemental information to autonomous vehicles, in addition to data collected by onboard vehicle sensors. The supplemental information may be associated with road and traffic conditions that are detected hundreds of meters ahead of the autonomous vehicles. Compared to data collected by individual vehicles using vehicle sensors, the supplemental information collected by the sensors disposed at the fixed installation tend to be more detailed and relevant to the installation. The sensors disposed at the fixed installation may be statically (e.g., fixedly or immovably) positioned at the fixed installation, thereby providing a stable and accurate detection coverage on the road and traffic conditions of a fixed area of a road associated with the fixed installation.

In some embodiments, the sensors positioned on an installation can detect objects, such as other vehicles or obstacles, that are beyond a sensing range of a vehicle's onboard sensors. According to some embodiments of the present disclosure, developments in wireless internet communication, such as 5G communication, can provide enough bandwidth for communication between an autonomous vehicle and one or more processors of the installation. For example, the one or more processors of an installation can send runtime scenario messages to a vehicle via the cloud. The messages can include traffic information or objects detected on the road that the vehicle is traveling, which are beyond a sensing range of the vehicle. The vehicle can receive the messages with minimal delay (e.g., within one or more milliseconds of sending), and adjust its steering behavior before it reaches that part of the road.

Accordingly, the systems and/or methods disclosed herein advantageously improve steering control in autonomous vehicles by providing additional traffic information that is beyond a sensing range of the vehicle sensors. Not only is the data collected by sensors positioned at a fixed installation of high quality, but it is also particularly suited for detecting runtime behaviors of other vehicles and actual road conditions, The additional information can be used by a vehicle to determine a suitable mode of its steering control model to use, to respond to the scenario ahead.

In one aspect, a method for vehicle steering control is implemented at a first vehicle (e.g., an ego vehicle) traveling along a first lane of a road. The first vehicle includes at least a first sensor, one or more processors, and memory. The memory stores instructions for at least partially autonomously driving the first vehicle. The method includes acquiring, from at least the first sensor, first data of one or more first objects in a vicinity of the first vehicle. In some embodiments, the one or more first objects include one or more vehicles. The method includes receiving from a computer system associated with a fixed installation having at least a second sensor, via a wireless network, second data corresponding to one or more second objects detected by at least the second sensor. In some embodiments, the fixed installation is located at a predefined location at the road position of the road, ahead of the first vehicle. In some embodiments, the second data are continuously received from the computer system as the first vehicle approaches the fixed installation. In some embodiments, the one or more second objects that are detected by the at least second sensor are beyond a sensing range of the at least the first sensor of the first vehicle. In some embodiments, the one or more second objects include one or more vehicles. The method includes adjusting, by the one or more processors of the first vehicle, a steering behavior of the first vehicle according to the first data and the second data. For example, in some embodiments, the one or more processors of the first vehicle adjust the steering behavior of the first vehicle to improve the steering accuracy of the vehicle within the same lane of travel. In some embodiments, the one or more processors of the first vehicle adjust the steering behavior of the first vehicle to manage a lateral offset of the vehicle with respect to its lane of travel. The method includes at least partially autonomously driving the first vehicle in a first trajectory along the first lane of the road (e.g., in the same lane) according to the steering behavior of the first vehicle.

In some embodiments, the method includes, prior to acquiring from at least the first sensor the first data of one or more objects, sending a request (e.g., a handshake request) to the computer system to establish a connection with the computer system.

In some embodiments, the second data include status information of the road at a corresponding distance ahead of the first vehicle, while the first vehicle is at a respective longitudinal position with respect to at least the second sensor. In some embodiments, the status information of the road is categorized into one or more categories. Each category corresponds to a respective lane of the road from a perspective of the first vehicle.

According to another aspect of the present application, a first vehicle includes at least a first sensor, a vehicle control system, one or more processors and memory coupled to the one or more processors. The memory stores instructions that, when executed by the one or more processors, cause the first vehicle to perform any of the methods for steering control adjustment as disclosed herein.

According to another aspect of the present application, a non-transitory computer readable storage medium stores instructions configured for execution by a first vehicle that includes at least a first sensor, a vehicle control system, one or more processors, and memory. The instructions, when executed by the one or more processors, cause the first vehicle to perform any of the methods for steering control adjustment as disclosed herein.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The accompanying drawings, which are included to provide a further understanding of the embodiments, are incorporated herein, constitute a part of the specification, illustrate the described embodiments, and, together with the description, serve to explain the underlying principles.

FIG. 8 illustrates bi-directional communication between a vehicle and an installation, in accordance with some embodiments.

FIG. 9 illustrates an example I2V message in protobuf format, in accordance with some embodiments.

FIG. 10 illustrates an example V2I message in protobuf format, in accordance with some embodiments.

FIGS. 13A to 13C provide a flowchart of an example process for vehicle steering control, in accordance with some embodiments.

Like reference numerals refer to corresponding parts throughout the several views of the drawings.

DETAILED DESCRIPTION

Figure 1:
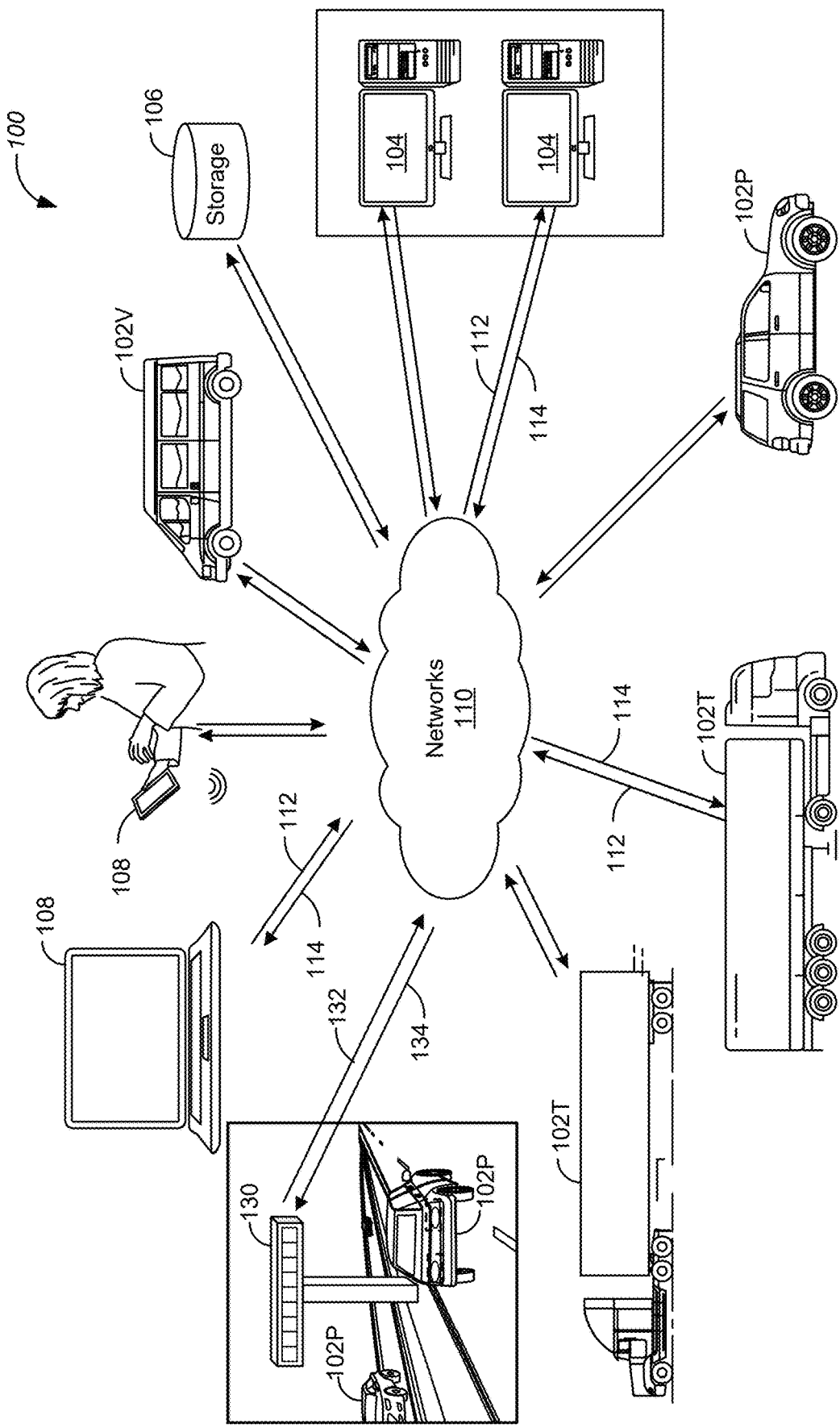
FIG. 1 is an example vehicle driving environment for a plurality of vehicles, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein.

But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to adjusting a steering control behavior of autonomous vehicles to facilitate autonomous driving. In some embodiments, a first vehicle (e.g., an autonomous vehicle or an ego vehicle) that is traveling along a first lane of a road includes at least a first sensor, one or more processors, and memory. In some embodiments, the first vehicle acquires first data of one or more first objects in a vicinity of the first vehicle. In some embodiments, the one or more first objects include one or more vehicles. In some embodiments, the first vehicle sends a request (e.g., a handshake request) to a computer system to establish a communication connection with a computer system that is associated with a fixed (e.g., immovable) installation (e.g., infrastructure or infrastructure node). The fixed installation includes at least a second sensor that is positioned on the installation. In some embodiments, the computer system (e.g., a microcontroller unit) is physically co-located at the fixed installation. In some embodiments, the computer system includes one or more distinct systems located at distinct locations of the road. For example, multiple installations, each having respective sensors, may be positioned along a stretch of a road (e.g., at intervals of every one kilometer, three kilometers, or five kilometers).

In some embodiments, the first vehicle receives from the computer system, via a wireless network, second data corresponding to one or more second objects detected by at least the second sensor. In some embodiments, the one or more second objects are within a predefined distance ahead of the first vehicle. In some embodiments, the one or more second objects detected by the at least second sensor are beyond a sensing range of the at least the first sensor of the first vehicle. In some embodiments, the second data include status information of the road at an associated distance ahead of the first vehicle (e.g., at 100 m, 200 m, or 300 m ahead of the first vehicle), while the first vehicle is at a respective longitudinal position with respect to at least the second sensor. In some embodiments, the status information of the road is categorized into one or more categories. Each category corresponds to a respective lane of the road from a perspective of the first vehicle. For example, the status information can include an average vehicle speed corresponding to a respective lane of the road, an average vehicle offset (e.g., a lateral offset) relative to a longitudinal axis positioned at a center of the respective lane of the road, a curvature of the respective lane, or a yaw rate of a set of respective vehicles driving on the respective lane.

In some embodiments, the first vehicle adjusts a steering behavior of the first vehicle according to the first data and the second data, and at least partially autonomously drives the first vehicle in a first trajectory along the first lane of the road according to the steering behavior of the first vehicle. In some embodiments, adjusting the steering behavior of the first vehicle includes controlling a steering control model of the first vehicle to at least partially autonomously drive the first vehicle in a tracking-based mode or a stability-based mode. In some embodiments, in the tracking based mode, the first vehicle is configured to maintain the lateral offset to be as close to zero as possible, meaning that the first vehicle would drive/stay in the middle of its lane to keep its distance from other vehicles in neighboring lanes. In some embodiments, in the stability-based mode, the steering model permits the first vehicle to deviate from the middle of its lane (e.g., assuming that other factors such as safety and obstacle detection are met) if departing from the middle of the lane enables a smoother ride to be achieved.

In some embodiments, in accordance with a determination by the first vehicle that the first vehicle cannot track the first travel trajectory, the first vehicle is configured to reject the first travel trajectory and control the first vehicle to at least partially autonomously drive the first vehicle according to a second travel trajectory that is different from the first travel trajectory. For example, in some embodiments, at least partially autonomously driving the first vehicle according to the second travel trajectory includes switching, by the first vehicle, from a first lane of the road to a second lane of the road.

In an exemplary scenario, the fixed installation is positioned at a toll booth, and the first vehicle travels on a road toward the toll booth. Following a handshake with the installation, the installation (e.g., via one or more processors of the installation) sends runtime messages containing status of one or more longitudinal points located at a fixed location, which has a respective distance (e.g., 200 m, 300 m, or 500 m) on the road ahead of the first vehicle. In some embodiments, the one or more processors of the fixed installation can determine information such as an average speed, an average lateral offset (e.g., an offset from the center of a lane) as other vehicles pass the longitudinal point. In some embodiments, the one or more processors of the fixed installation send runtime messages to the first vehicle via a wireless communication network such as a 3G, 4G, or 5G network. For example, the one or more processors of the installation can send the runtime messages to the first vehicle continuously, at a predefined rate such as 10 messages/second, 5 messages/second, or 2 messages/second. The first vehicle that receives the messages can use the messages as a reference for adjusting a steering model of the first vehicle as it travels toward the toll booth. In some embodiments, the steering model of the first vehicle is configured to operate in a tracking-based mode and a stability-based mode (see discussion above).

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; (9) an inertial measurement unit (IMU) for measuring and reporting acceleration, orientation, angular rates, and other gravitational forces; and/or (10) an odometry sensor. In some embodiments, a vehicle 102 includes a 5G communication module to facilitate vehicle communication jointly with or in place of the DSRC module. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G/5G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models (i.e., machine learning models 250 in FIG. 2), each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

In some embodiments, the vehicle driving environment 100 further includes one or more installations 130 (e.g., an infrastructure) that are situated along a road. For example, in some embodiments, the installations 130 can positioned at locations along a road where traffic may be prone to buildup, such as a freeway entrance or exit, a lane merge zone (e.g., on a section of a road where two or more lanes merge), a tunnel, a toll booth, a traffic light area, an on-ramp region of a highway, and/or a junction (e.g., an intersection) where two or more roads converge, diverge, meet or cross. In some embodiments, a segment of a road can have multiple installations 130 that are positioned at regular intervals (e.g., every kilometer, every mile, every 2 miles, etc.) along the road. In some embodiments, the installations 130 include fixed, immovable structures. In some embodiments, the installations 130 are positioned ahead of traffic of interest (e.g., the vehicles are driving in a direction toward the installations).

The one or more installations 130, the plurality of vehicles 102, the one or more servers 104, and the one or more client devices 108 are communicatively coupled to each other via the one or more communication networks 110. In some embodiments, a vehicle 102 can be equipped with a vehicle-to-infrastructure (V2I) communication system, in which the vehicle 102 and the one of more installations 130 are communicating nodes that provide each other with information such as traffic information, weather information, road condition information, and safety warnings. In accordance with some embodiments, V2I involves the exchange of information between vehicles 102 and components (e.g., sensors 660, communication module 616, data processing module 626, and other components) of an installation 130. In some embodiments, a respective vehicle 102 can be equipped with a vehicle-to-everything (V2X) communication system, in which the respective vehicle 102 can exchange information with the one of more installations 130 as well as with other vehicles that may be driving along the same road (e.g., route), or a different road, as the respective vehicle 102. The V2I and/or V2X communication system can be powered using 3G/4G/5G connectivity to a wireless carrier, or through a network interface (e.g., a router, a switch, a gateway, a hub, or an intelligent, dedicated whole-home control node), or through any combination thereof. In some embodiments, the V2I or V2X communication are powered by 5G, which advantageously allows large bandwidth, low latency information sharing between the vehicles and the installations, providing new opportunities for road condition estimation and weather conditions perception.

The installations 130 include one or more sensors 660 positioned at the installations 130. The sensors 660 are fixedly located on the installations 130 and are configured to detect, monitor, and gather data on various traffic-related parameters (e.g., vehicle traffic data, including traffic density, an average vehicle speed, honking/beeping from vehicles). In accordance with some embodiments of the present disclosure, the information collected by the sensors 660 are more detailed and instantaneous compared to information collected using a perception system on a single autonomous vehicle, because they have a fixed location, better detection coverage, and a defined field of view. In some embodiments, the one or more sensors incudes one or more of: an imaging sensor, a camera, a microphone (which may be part of the camera or separate from the camera), an anemometer (e.g., a wind speed and direction sensor), a global positioning system (GPS), a thermal sensor (e.g., a temperature sensor), an acoustic sensor, a microphone, a light detection and ranging (LiDAR) scanner, a radio detection and ranging (RADAR) sensor, an infrared sensor, an ultrasonic sensor. In some embodiments, the installations 130 include one or more inductive loop detectors for transmitting and receiving communication signals, and/or detecting the presence or vehicles.

In some embodiments, a respective installation 130 includes a communication module for facilitating information sharing between the vehicles 102 and the installation 130. For example, in some embodiments, the installation 130 gathers, from the vehicles 102 via the communication module, vehicle information 134. The vehicle information 134 can include information about vehicle dynamics (e.g., vehicle velocities and accelerations), vehicle data 112, and/or the additional vehicle information 114. In some embodiments, the vehicle information 134 can also include traffic, road, and/or weather information that are communicated from the vehicles 102 to the installation 130.

In some embodiments, the installation 130 provides at least a subset of infrastructure information 132 to the vehicles 102 and/or the one or more servers 104. The infrastructure information 132 can include sensor data collected by the sensors 660 and/or data processed by a computing unit of the installation 130 based on the sensor data and the vehicle information 134.

It is noted that the installation 130 illustrated in FIG. 1 does not reflect an actual size of the installation 130. In some embodiments, the installation 130 corresponds to an existing structure (e.g., a light pole, a billboard) standing near or on the road. Alternatively, in some embodiments, the installation 130 is a dedicated structure built at a fixed location near or on the road for collecting information of local road or whether conditions. The installation 130 may not be visible or discernable to passing vehicles from its appearance.

Figure 2:
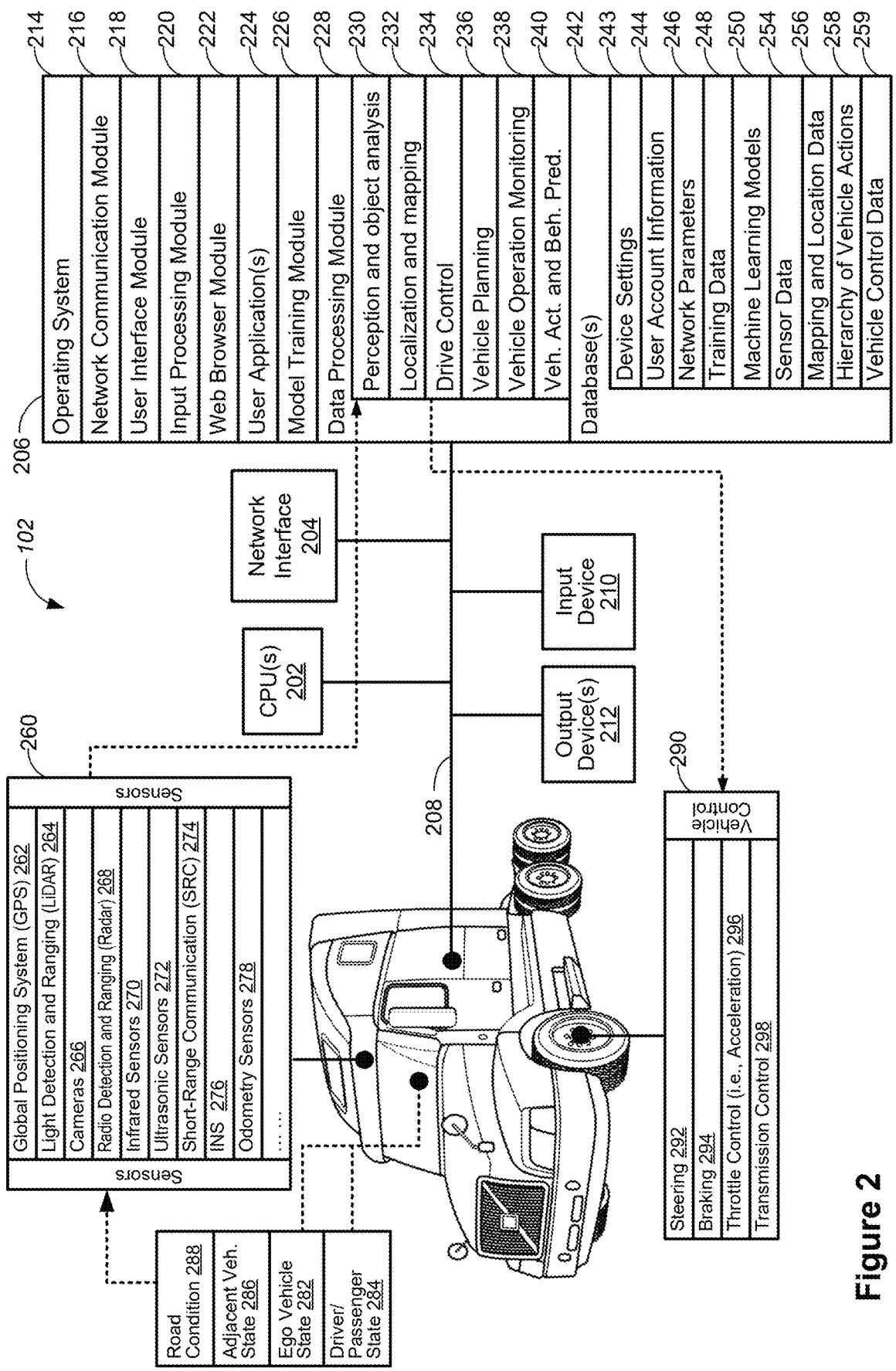
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, an SRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The SRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiment, the steering control 292 applies a steering model (e.g., machine learning models 250) to enable a steering operation of the vehicle 102. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a machine learning model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle action and behavior prediction 240;
- a vehicle database 242, which stores vehicle data 112, including:
  - device settings 243, including common device settings (e.g., service tier, device model, storage capacity, processing capabilities, communication capabilities, and/or medical procedure settings) of the vehicle 102;
  - user account information 244 for the one or more user applications 224 (e.g., user names, security questions, account history data, user preferences, and predefined account settings);
  - network parameters 246 for the one or more communication networks 110, (e.g., IP address, subnet mask, default gateway, DNS server, and host name);
  - training data 248 for training the machine learning model 250;
  - machine learning models 250 for processing vehicle data 112, where in some embodiments, the machine learning model 250 is applied to process one or more images captured by a first vehicle 102A and predict a sequence of vehicle actions of a second vehicle through a hierarchy of interconnected vehicle actions;
  - sensor data 254 captured or measured by the plurality of sensors 260;
  - mapping and location data 256, which is determined from the sensor data 254 to map the vehicle driving environment 100 and locations of the vehicle 102 in the environment 100;
  - a hierarchy of interconnected vehicle actions 258 including a plurality of predefined vehicle actions that are organized to define a plurality of vehicle action sequences; and
  - vehicle control data 259, which is automatically generated by the vehicle 102 or manually input by the user via the vehicle control system 290 based on predicted vehicle actions to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
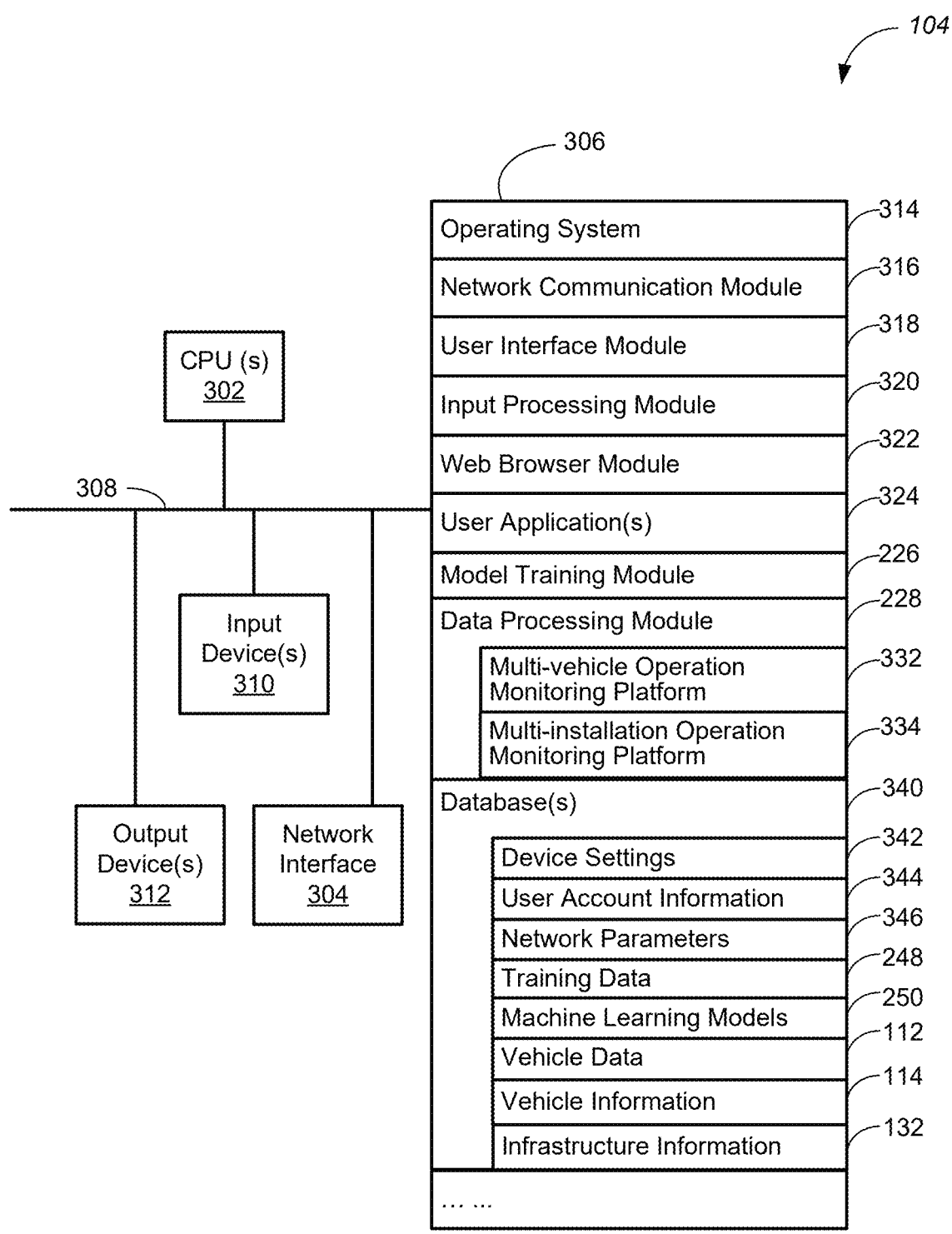
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

- an operating system 314, which includes procedures for handling various basic system services and for performing hardware dependent tasks;
- a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;
- a user interface module 318, which enables presentation of information (e.g., a graphical user interface for user application 324, widgets, websites and web pages thereof, audio content, and/or video content) at the vehicle 102 via one or more output devices 312 (e.g., displays or speakers);
- an input processing module 320, which detects one or more user inputs or interactions from one of the one or more input devices 310 and interprets the detected input or interaction;
- a web browser module 322, which navigates, requests (e.g., via HTTP), and displays websites and web pages thereof, including a web interface for logging into a user account of a user application 324;
- one or more user applications 324, which are executed at the server 104. The user applications 324 include a vehicle user application that associates vehicles 102 with user accounts and facilitates controlling the vehicles 102, and enables users to edit and review settings and data associated with the vehicles 102;
- a model training module 226, which trains a machine learning model 250, where the model 250 includes at least one neural network and is applied to process vehicle data (e.g., sensor data and vehicle control data) of one or more vehicles 102;
- a data processing module 228, which manages:
  - a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate); and
  - a multi-installation operation monitoring platform 334 configured to collect infrastructure information 132 from a plurality of installations 130, monitor installation operation, detect faults (e.g., sensor 660 faults). In some embodiments, infrastructure information 132 for each individual installation 130 is managed separately. In some embodiments, infrastructure information 132 from multiple installations 130 are processed jointly (e.g., statistically, in the aggregate);
- one or more databases 340 for storing vehicle server data and infrastructure (e.g., installation) data, including:
  - device settings 342, which include common device settings (e.g., service tier, device model, storage capacity, processing capabilities, communication capabilities, and/or medical procedure settings) of the server 104;
  - user account information 344 for the one or more user applications 324 (e.g., user names, security questions, account history data, user preferences, and predefined account settings);
  - network parameters 346 for the one or more communication networks 110, (e.g., IP address, subnet mask, default gateway, DNS server, and host name);
  - training data 248 for training the machine learning model 250;
  - machine learning models 250 for processing vehicle data;
  - vehicle data 112, which is collected from a plurality of vehicles 102 and includes sensor data 254, mapping and location data 256, and vehicle control data 259;
  - additional vehicle information 114, including vehicle operation information, fault information, and/or driving solution information, which are generated from the collected vehicle data 112; and
  - infrastructure information 132, including data collected by sensors 660 of the installations 130 and data processed by the installations 130 based on the data collected by the sensors 660 and the vehicle information 134.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
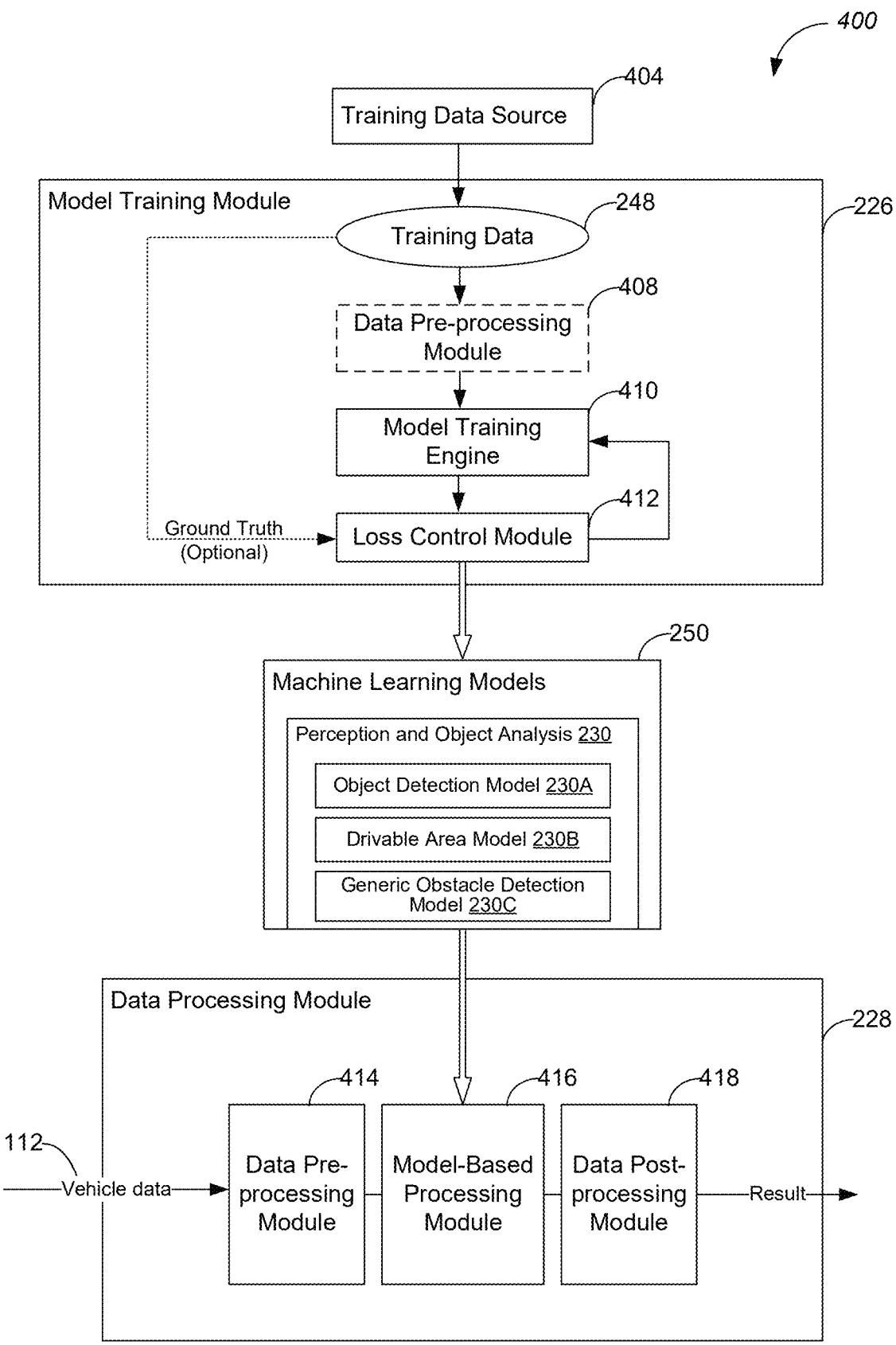
FIG. 4 is a block diagram of a machine learning system for training and applying vehicle data processing models for facilitating at least partial autonomous driving of a vehicle, in accordance with some embodiments.
Figure 5A:
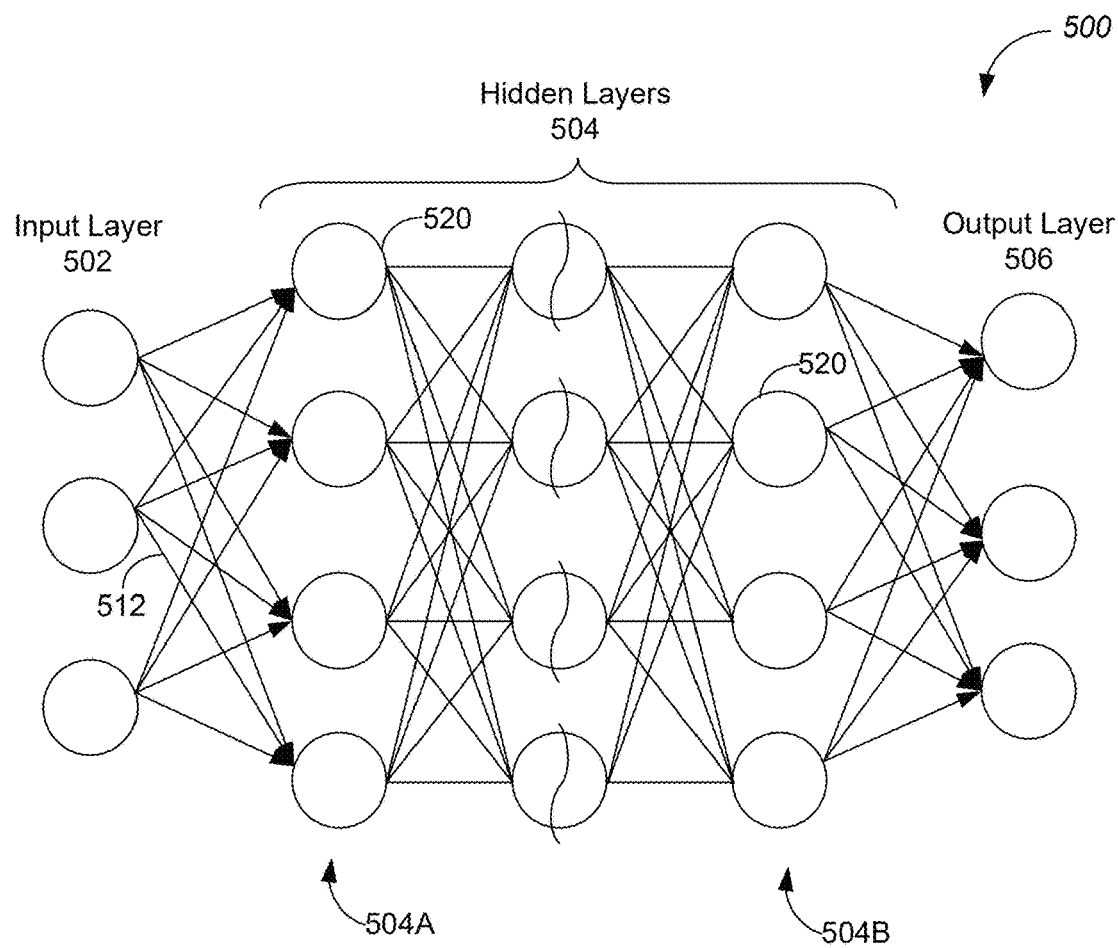
FIG. 5A is a structural diagram of an example neural network applied to process vehicle data in a vehicle data processing model, in accordance with some embodiments.
Figure 5B:
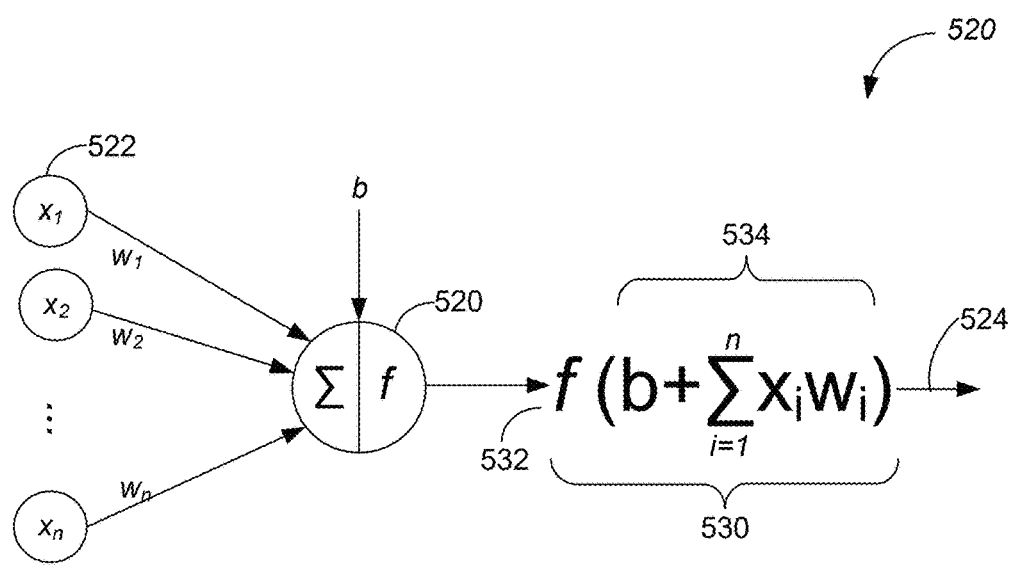
FIG. 5B is an example node in the neural network, in accordance with some embodiments.
Figure 6:
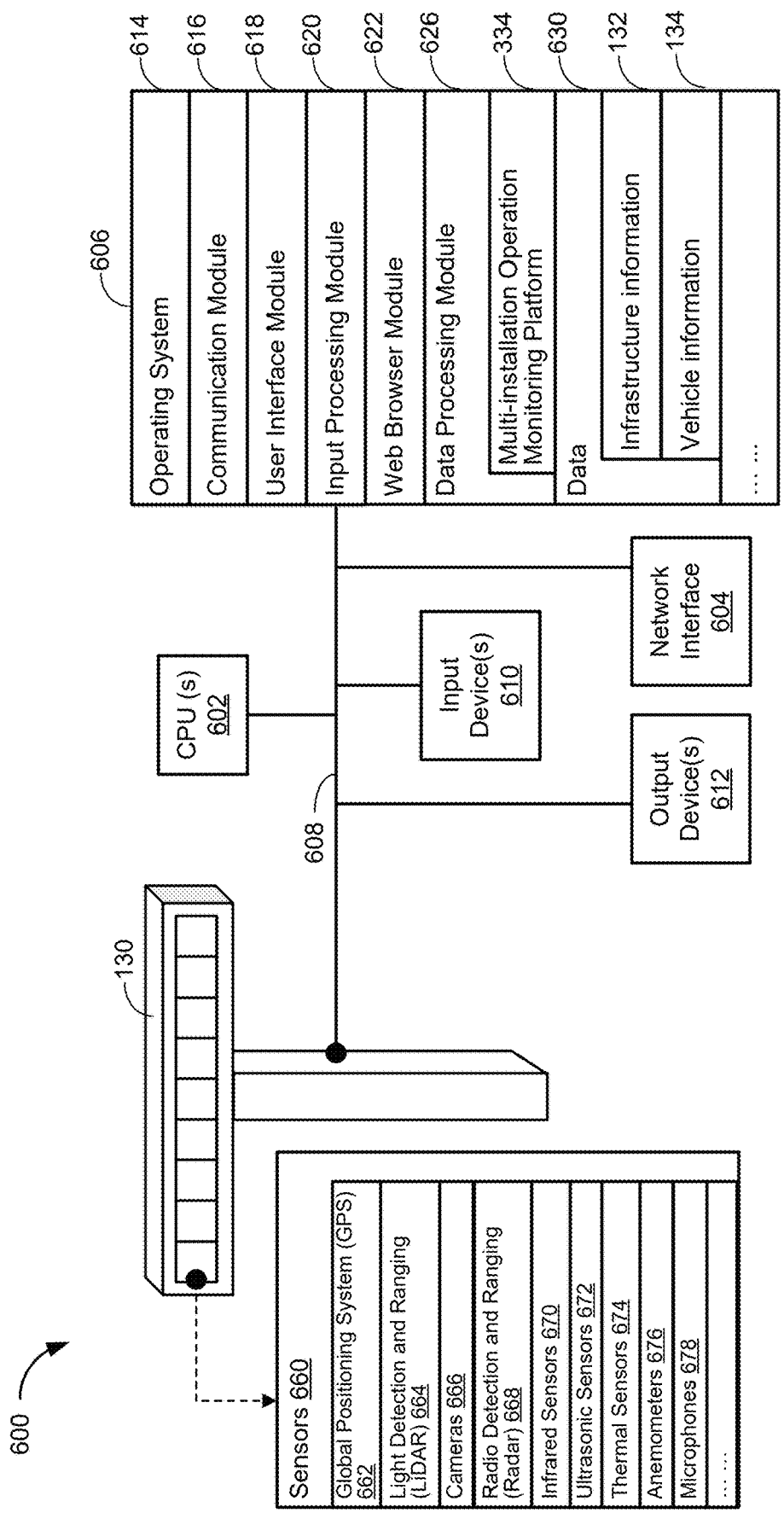
FIG. 6 is a block diagram of a computer system associated with an installation, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 259. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle action and behavior prediction 240 (FIG. 2). Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 226 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a predefined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

In some embodiments, the data processing module 228 of the vehicle 102 (e.g., a first vehicle) is applied to perform perception and object analysis 230 by obtaining a road image including a road surface along which the first vehicle is travelling, identifying one or more identifiable objects on the road surface in the road image, and detecting a plurality of objects on the road surface in the road image. The data processing module 228 eliminates the one or more identifiable objects from the plurality of objects in the road image to determine one or more unidentifiable objects on the road surface in the road image. The first vehicle is at least partially autonomously driven by treating the one or more unidentifiable objects differently from the one or more identifiable objects. Further, in some embodiments, the machine learning models 250 of the vehicle 102 includes an object detection model 230A and a drivable area model 230B. The object detection model 230A is configured to identify the one or more identifiable objects in the road image and associate each identifiable object with a predefined object type or class. The drivable area model 230B is configured to determine a road surface in the road image. Additionally, in some embodiments, the machine learning models 250 includes a generic obstacle detection model 230C configured to detect a plurality of objects on the road surface in the road image, e.g., with or without determining a predefined object type or class of each of the plurality of objects. The generic obstacle detection model 230C is optionally modified from the drivable area model 230C by way of retraining.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted combination 534 from the previous layer before the activation function 532 is applied. The network bias b provides a perturbation that helps the neural network 500 avoid over fitting the training data. In some embodiments, the result of the training includes a network bias parameter b for each layer.

FIG. 6 is a block diagram of a computer system 600 associated with an installation 130 for detecting conditions for vehicle driving in a vehicle driving environment (e.g., the environment 100 in FIG. 1), in accordance with some embodiments. The installation 130 includes a plurality of sensors 660. In some embodiments, the plurality of sensors 660 include one or more of a GPS 662, a LiDAR scanner 664, one or more cameras 666, a RADAR sensor 668, one or more infrared sensor 670, one or more ultrasonic sensors 672, one or more thermal sensors 674 (e.g., for measuring heat and/or temperature), one or more anemometers 676 for measuring wind speed and wind direction, and one or more microphones 678 for capturing audio in a vicinity of the installation 130. In some embodiments, the one or more microphones 678 are part of the cameras 666. In some embodiments, the one or more microphones 678 are separate from the cameras 666. In some embodiments, the plurality of sensors 660 include one or more inductive loop detectors 680 for transmitting and receiving communication signals, and/or detecting the presence or vehicles.

In some embodiments, the computer system 600 is physically co-located at the installation 130. For example, the computer system 600 includes a microcontroller chip that is located locally at the installation 130, and at least a subset of the data collected at the installation 130 (e.g., using the sensors 660) is processed locally by the computer system 600. In some embodiments, the computer system 600 is at a physical location different from the installation 130. For example, the computer system 600 can include a cloud computer system that is communicatively connected to the installation 130. In some embodiments, the computer system includes one or more distinct systems located at distinct locations of a road or distinct systems located at different roads. Examples of the computer system 600 include, but are not limited to, a server computer, a desktop computer, a laptop computer, a tablet computer, or a mobile phone. The computer system 600 typically includes one or more processing units (CPUs) 602, one or more network interfaces 604, memory 606, and one or more communication buses 608 for interconnecting these components (sometimes called a chipset). The computer system 600 includes one or more user interface devices. The user interface devices include one or more input devices 610, which facilitate user input, such as a keyboard, a mouse, a voice-command input unit or microphone, a touch screen display, a touch-sensitive input pad, a gesture capturing camera, or other input buttons or controls. Furthermore, in some embodiments, the computer system 600 uses a microphone and voice recognition or a camera and gesture recognition to supplement or replace the keyboard. In some embodiments, the one or more input devices 610 include one or more cameras, scanners, or photo sensor units for capturing images, for example, of graphic serial codes printed on electronic devices. The computer system 600 also includes one or more output devices 610, which enable presentation of user interfaces and display content, including one or more speakers and/or one or more visual displays.

The memory 606 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 606 includes one or more storage devices remotely located from the one or more processing units 602. The memory 606, or alternatively the non-volatile memory within memory 606, includes a non-transitory computer readable storage medium. In some embodiments, the memory 606, or the non-transitory computer readable storage medium of the memory 606, stores the following programs, modules, and data structures, or a subset or superset thereof:

- an operating system 614, which includes procedures for handling various basic system services and for performing hardware dependent tasks;
- a communication module 616, which connects the computer system to other devices (e.g., vehicles 102, server 104, installations 130, and/or client devices 108) via one or more network interfaces (wired or wireless) and one or more communication networks 110, such as the Internet, other wide area networks, local area networks, metropolitan area networks, and so on. In some embodiments, the communications module 616 gathers information about road and weather conditions from vehicles 102 via a V2I or a V2X communication system that is installed on the vehicles 102. In some embodiments, the V2I or V2X communication system operate on a network that provides high speed, low latency communication;
- a user interface module 618, which enables presentation of information, widgets, websites and web pages thereof, audio content, and/or video content) via one or more output devices 612 (e.g., displays or speakers);
- an input processing module 620, which detects one or more user inputs or interactions from one of the one or more input devices 610 and interprets the detected input or interaction;
- a web browser module 622, which navigates, requests (e.g., via HTTP), and displays websites and web pages thereof;
- a data processing module 626, which manages a multi-installation operation monitoring platform 334 configured to collect infrastructure information 132 from a plurality of installations 130, monitor installation operation, detect faults (e.g., faults from sensors 660). In some embodiments, the data processing module 626 manages infrastructure information 132 for each individual installation 130 separately or processes infrastructure information 132 from multiple installations 130 jointly (e.g., statistically, in the aggregate);
- one or more machine learning models 628. In some embodiments, the machine learning models 628 include at least one neural network and is applied to process vehicle traffic data collected by the sensors 660 and output a determination of whether the vehicle traffic data constitutes an event;
- data 630 that is stored locally on the computer system 600 or on one or more databases (e.g., database(s) 340), including:
  - infrastructure information 132. In some embodiments, infrastructure information 132 includes data collected by sensors 660 of installations 130. In some embodiments, infrastructure information 132 includes data that is processed by the installations 130 (e.g., via computer system 600) according to data collected by sensors 660 and/or vehicle information 134; and
  - vehicle information 134. In some embodiments, vehicle information 134 includes information gathered by installations 130 from vehicles 102 via communication module 616. In some embodiments, vehicle information 134 includes information about vehicle dynamics (e.g., vehicle velocities and accelerations), vehicle data 112, and/or the additional vehicle information 114. In some embodiments, the vehicle information 134 includes include traffic, road, and/or weather information that are transmitted from the vehicles 102 to the installations 130.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 606 stores a subset of the modules and data structures identified above. In some embodiments, the memory 606 stores additional modules and data structures not described above. In some embodiments, a subset of the operations performed at the computer system 600 can also be performed at the server 104.

Figure 7:
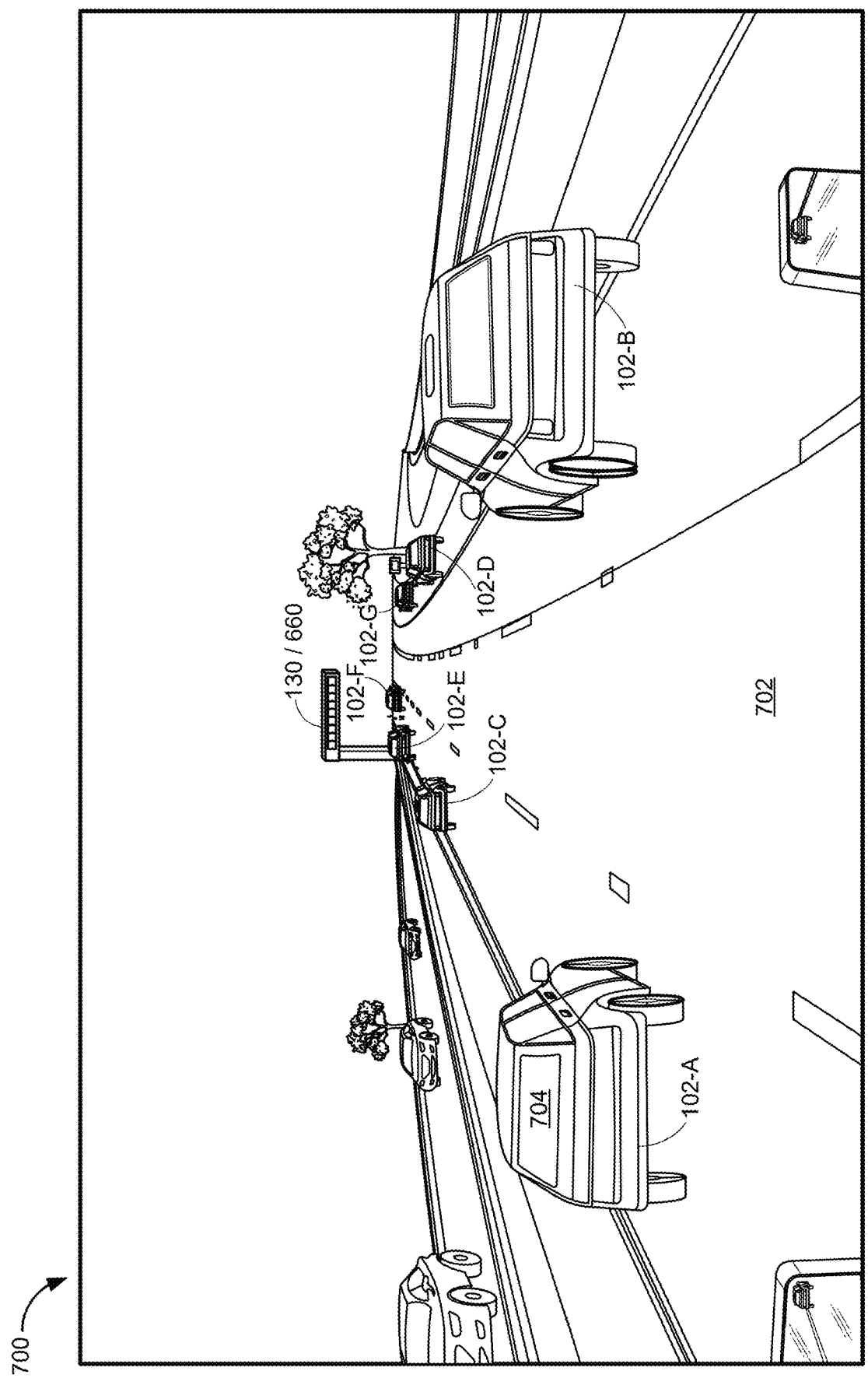
FIG. 7 illustrates an exemplary scene where vehicles are traveling on a road that includes an installation, in accordance with some embodiments.

FIG. 7A illustrates an exemplary scene 700 where vehicles 102 (e.g., vehicle 102-A to vehicle 102-G) are traveling on a road 702 that includes an installation 130, in accordance with some embodiments. The installation 130 is positioned along the road 702 and the vehicles 102-A to 102-G are traveling in a direction toward the installation 130.

In some embodiments, a distance between the vehicle 102-A and the vehicle 102-C can be 50 m to 100 m, whereas a distance between the vehicle 102-A and the vehicle 102-F (or the vehicle 102-G) can be 500 m, 1 km, 2 km, or 3 km. In some embodiments, the vehicle 102-A includes sensors 704 (e.g., sensors 260) that are positioned onboard the vehicle 102-A. In some embodiments, the vehicle 102-B and the vehicle 102-C are within a sensing range of the sensors 704. In some embodiments, the vehicle 102-F and the vehicle 102-G are outside the sensing range of the sensors 704.

In some embodiments, the installation 130 includes sensors 660 that are fixedly positioned on the installation 130. The sensors 660 collect data of vehicles traveling on the road. In some embodiments, the sensors 660 have a sensing range that is capable of detecting all the vehicles 102-A to 102-G on the road 702.

In some embodiments, a respective vehicle 102 (e.g., vehicle 102-A) is equipped with a V2I communication system (e.g., communication module 616) that facilitates communication between the vehicle 102 and the installation 130 (e.g., via CPU(s) 602). In some embodiments, the CPU(s) 602 generates traffic information according to data collected by the sensors 660. Exemplary traffic information can include real-time information about traffic flow (e.g., an average speed of vehicles traveling on the road, or an average speed of vehicles traveling on a respective lane of the road), traffic signal timings (when the road includes traffic lights), and/or presence of traffic incidents.

FIG. 8 illustrates example bi-directional communication 800 between a vehicle and an installation 130, in accordance with some embodiments. In some embodiments, the bi-directional communication 800 uses a unified message authentication code. In some embodiments, the communication exchange occurs over a wireless communication network, such as a 5G network. In some embodiments, the messages are transmitted using a gRPC framework (e.g., in a protobuf, or protocol buffer format).

In some embodiments, the bi-directional communication includes vehicle-to-infrastructure (V2I) communication, represented by communication stream 810 from a vehicle 102 to an installation 130. An example V2I communication can be a vehicle state message that is transmitted from the vehicle 102 to the installation 130. In some embodiments, the V2I communication occurs at predetermined intervals, such as 1 Hz, 2 Hz, or 5 Hz. In some embodiments, the bi-directional communication includes infrastructure-to-vehicle (I2V) communication, represented by communication stream 820 from the installation 130 to the vehicle 102. An example I2V communication can be an event message that is transmitted from the installation 130 to the vehicle 102. In some embodiments, the I2V communication frequency is sparse and trigger-based.

FIG. 9 illustrates an example I2V message 900 in protobuf format, in accordance with some embodiments.

In some embodiments, the message 900 defines a lane segment with the following optional fields (i) "lane_id": an unsigned 32-bit integer representing the lane identifier; (ii) "segment_id": an unsigned 32-bit integer representing the segment identifier; (iii) "start_s": a double representing the starting distance of the lane and (iv) "end_s": a double representing the ending distance of the lane. The underscore "s" in the optional fields (iii) and (iv) represent a longitudinal displacement along the road relative to the position of an ego vehicle 102. In some embodiments, the fields (iii) and (iv) have units of length (e.g., meters, feet, or kilometers). In some embodiments, the message 900 includes the optional fields (v) "curvature": a double representing the curvature of the lane; (vi) "avg_speed": a double representing the average speed on the lane; (vii) "avg_lateral_offset": a double representing the average lateral offset; (viii) "avg_heading": a double representing the average heading or average orientation of the vehicle in global coordinates (e.g., yaw); and (ix) "avg_yawrate": a double representing the average yaw rate.

In some embodiments, the message describes infrastructure event information (e.g., event information collected by the installation 130) with fields "header," "segments," "traffic_lights," and "road_signs." In some embodiments, the "header" field has a SyncMessage type field that contains tracking and security synchronization information. In some embodiments, the "segments" field is a repeated field of LaneSegmentInfo messages and represents information about multiple road segments. In some embodiments, the "traffic_lights" field is a repeated field of TrafficLight messages and represents information about multiple traffic lights. In some embodiments, the "road_signs" field is a repeated field of Sign messages and represents information about multiple road signs.

FIG. 10 illustrates an example V2I message 1000 in protobuf format, in accordance with some embodiments.

In some embodiments, the message 1000 defines a vehicle state with the fields (i) "header" for tracking and security synchronization; (ii) "spatial_info" for spatial information of the ego vehicle, (iii) "status" for a status of the automated driving system *ADS) of the ego vehicle (e.g., healthy or faulty), (iv) "total_lanes" for a total number of lanes on road (e.g., "total_lanes" is −1 when lane information is not available); and (v) "current_lane" for a current lane index of the ego vehicle. In some embodiments, "0" labels the leftmost lane and "−1" indicates that lane information is not available.

Figure 11A:
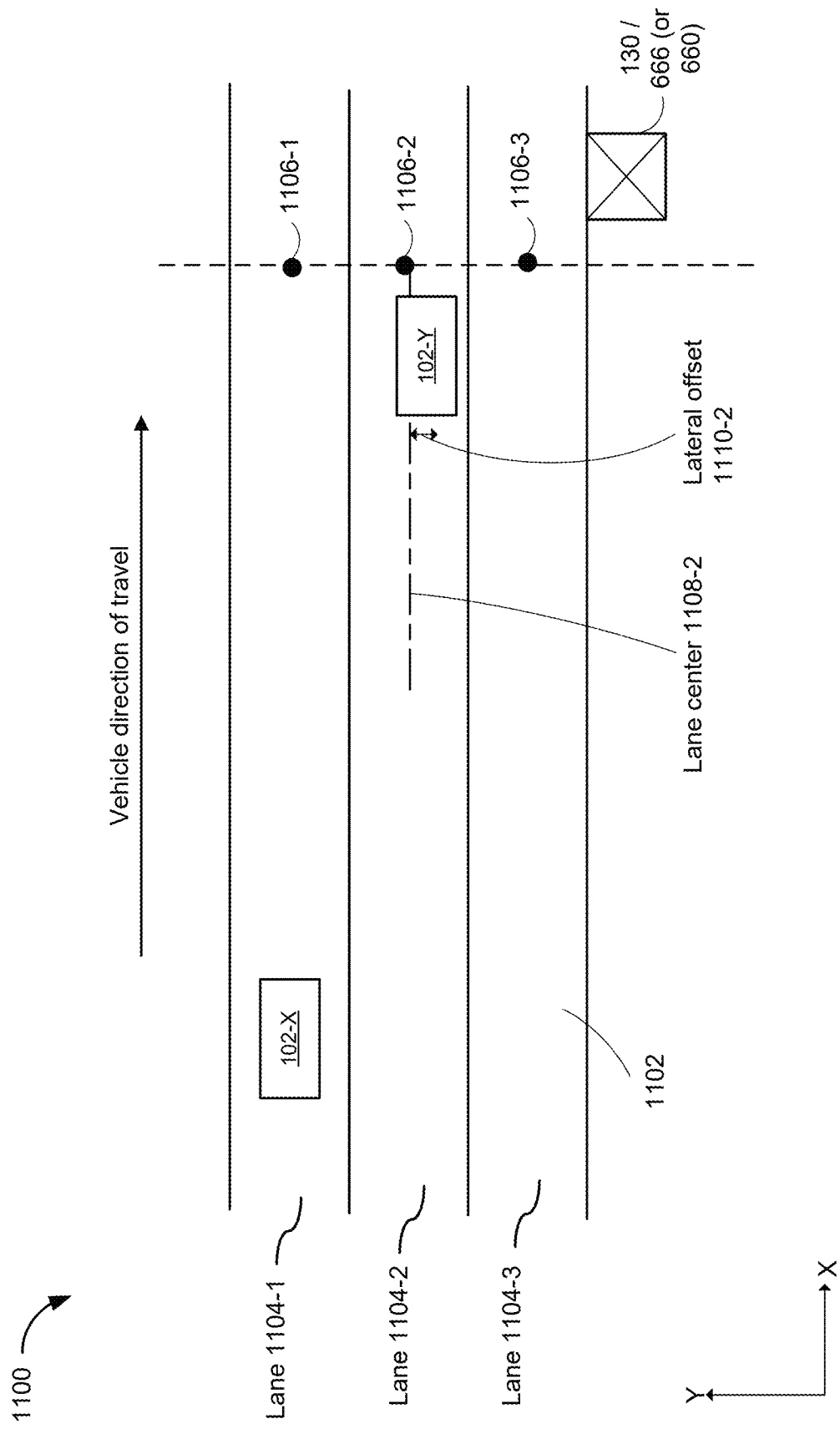
FIG. 11A illustrates an example schematic plan view image of a road, in accordance with some embodiments.

FIG. 11A illustrates an example schematic plan view image 1100 of a road 1102, in accordance with some embodiments. The road 1102 includes a plurality of lanes 1104 (e.g., lanes 1104-1, 1104-2, and 1104-3), and an installation 130 with one or more cameras 666. An ego vehicle 102-X is traveling in the lane 1104-1, in the direction toward the installation 130. In some embodiments, each lane 1104 includes a respective longitudinal point 1106 (e.g., longitudinal points 1106-1, 1106-2, and 1106-3 shown in FIG. 7B). In some embodiments, the respective longitudinal point is a predetermined position on the road 1102, ahead of the ego vehicle 102-X, that is within a field of view of the cameras 666.

In some embodiments, the cameras 666 can detect vehicle information such as vehicle type and vehicle plate (e.g., similar to cameras at toll booths or freeways). In some embodiments, the cameras 666 are configured (e.g., pre-calibrated) to determine an absolute location (e.g., as coordinates) of the longitudinal points 1106. In some embodiments, the one or more processors of the installation 130 (e.g., CPU(s) 602) are configured to determine vehicle status information (e.g., vehicle information 134) of a respective vehicle as the vehicle passes through its respective longitudinal point 1106. In some embodiments, the vehicle status information can include a longitudinal location, a lane ID, a vehicle speed (e.g., absolute and average vehicle speed), and a lateral offset. In FIG. 7B, suppose that the x-axis is defined as the direction along the length lanes 754 and the y-axis is defined as the direction along the width of the lanes. In this example, the lateral offset 1110-2 of a vehicle 102-Y that is traveling in a respective lane 1104-2 refers the distance along the y-axis between that vehicle (102-Y) and the respective lane center 1108-2, as illustrated in FIG. 7B. In some embodiments, the one or more processors of the installation 130 is configured to determine natural data of a respective longitudinal point 756, such as its curvature and yaw.

Figure 11B:
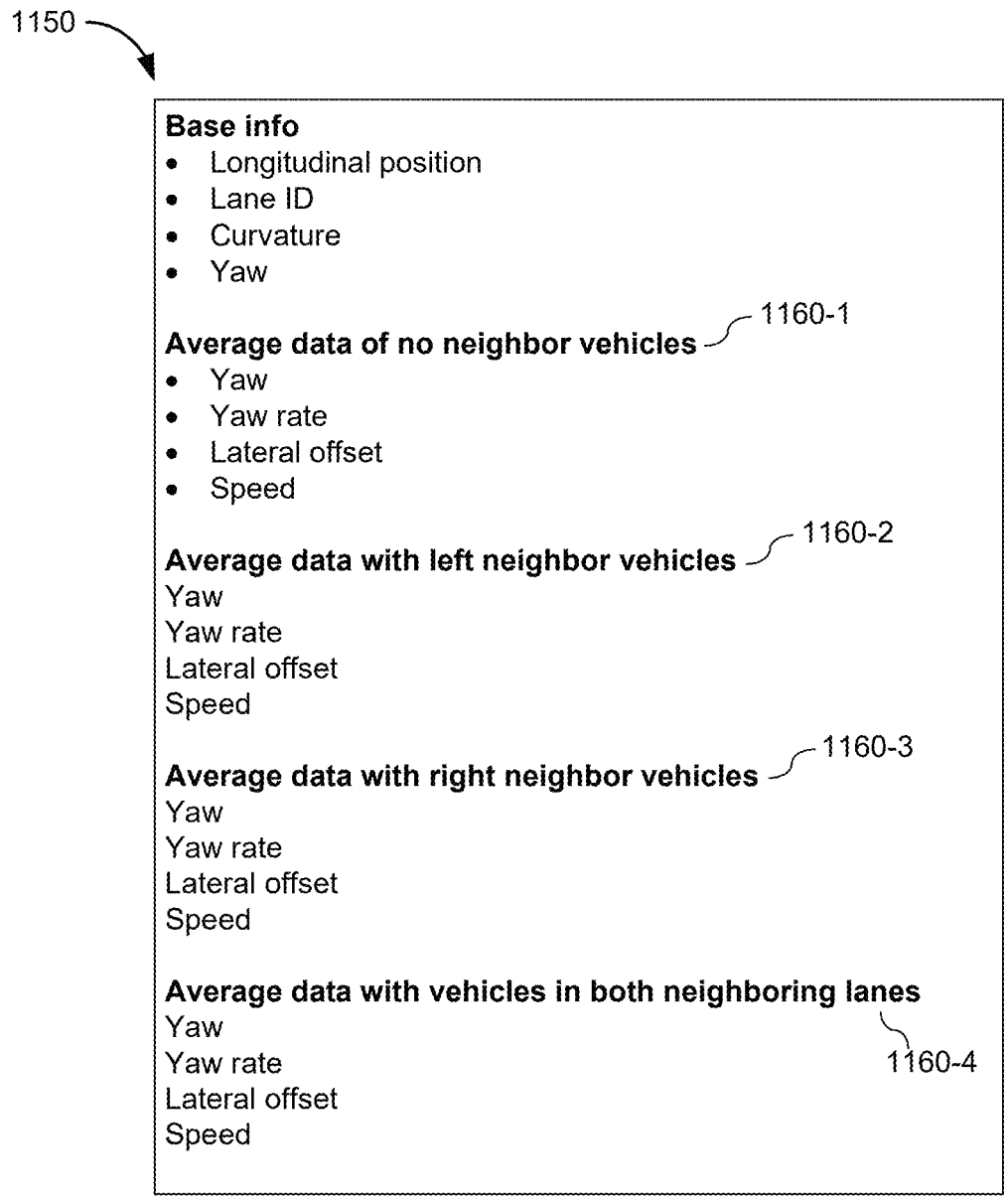
FIG. 11B illustrates an example data structure for communicating status information of a respective longitudinal point, in accordance with some embodiments.

In some embodiments, the vehicle status information can be assigned into a respective category of one or more categories 1160 (see FIG. 11B). Exemplary categories can include a first category 1160-1 "no other vehicle exists in neighbor lane," a second category 1160-2 "other vehicles exist in left neighbor lane," a third category 1160-3 "other vehicles exist in right neighbor lane," and a fourth category 1160-4 "other vehicles exist in both neighbor lanes."

FIG. 11B illustrates an example data structure 1150 for communicating status information of a respective longitudinal point 1106 (e.g., 1106-1 or 1106-2 or 1106-3) of the road 1102, in accordance with some embodiments. In some embodiments, the status information of the long respective longitudinal point 1106 includes average data such as an average yaw, an average yaw rate, an average lateral offset, and an average speed that is computed for each of the categories 1160-1 to 1160-4.

Figure 12:
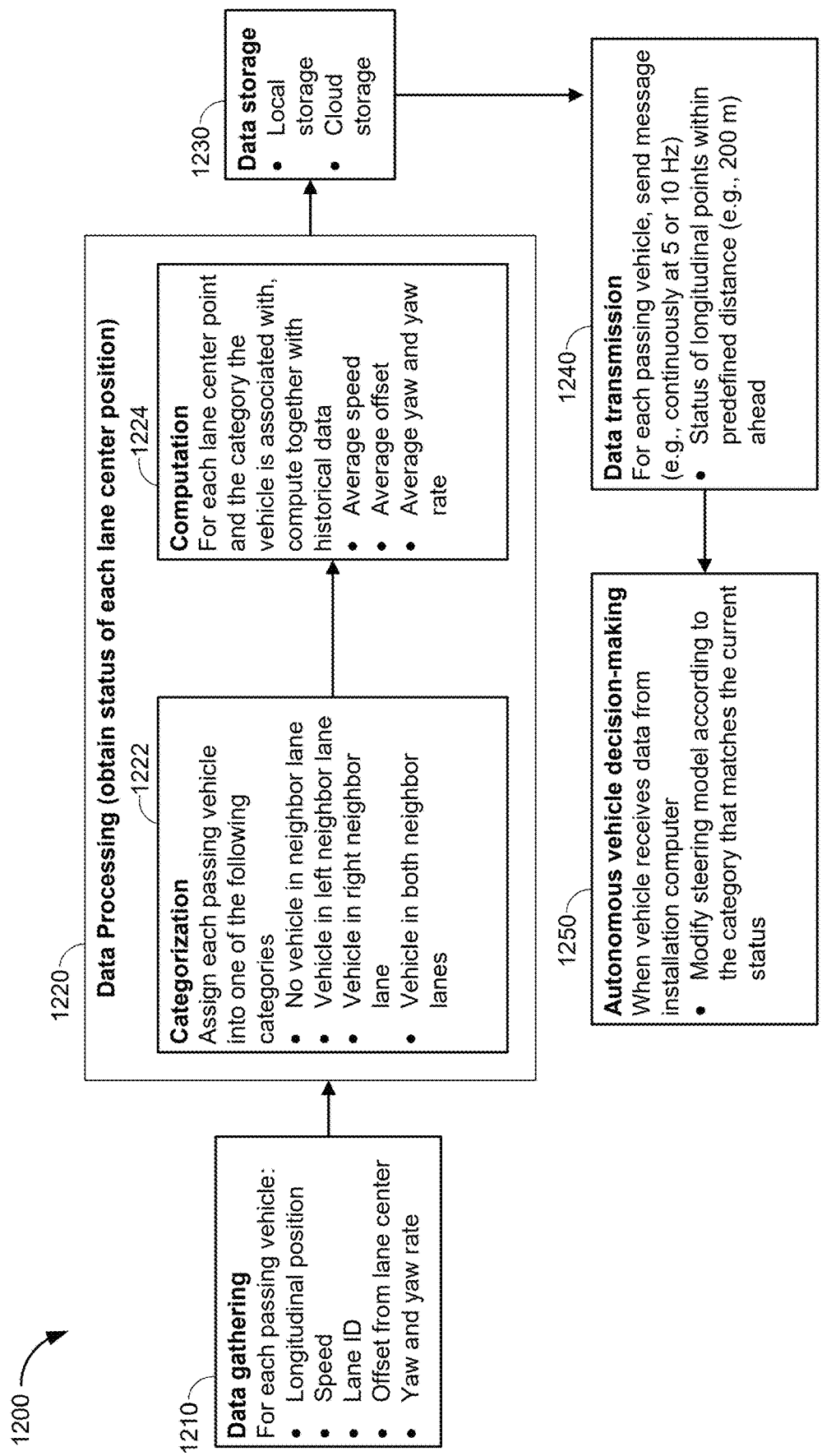
FIG. 12 illustrates an exemplary workflow for at least partially autonomously driving a vehicle based on sensor data collected at an installation, in accordance with some embodiments.

FIG. 12 illustrates an exemplary workflow 1200 for at least partially autonomously driving a vehicle based on sensor data collected at an installation 130, in accordance with some embodiments. The workflow 1200 includes a data gathering step 1210 that is performed by one or more sensors (e.g., sensors 660) positioned at an installation 130. In some embodiments, for each passing vehicle, the sensors 660 (and CPU(s) 602) determine a respective longitudinal position, a speed (e.g., an absolute speed or an average speed), a lane ID, an offset (e.g., lateral offset) from the lane center, a yaw, and a yaw rate for the vehicle.

In some embodiments, the workflow 1200 includes a data processing step 1220 that is performed by the processors (e.g., CPU(s) 602) of the installation 130. In some embodiments, the goal of the data processing step 1220 is to obtain a status of each lane center position. The data processing step 1220 can include a categorization process 1222 and a computation process 1224. For example, in some embodiments, in the categorization process, the CPU(s) 602 assign each passing vehicle into one of the categories: "No vehicle in neighbor lane" (e.g., category 1160-1), "Vehicle in left neighbor lane" (e.g., category 1160-2), "Vehicle in right neighbor lane" (e.g., category 1160-3), and "Vehicle in both neighbor lanes" (e.g., category 1160-4). In some embodiments, in the computation process 1224, the CPU(s) 602 determine (e.g., compute), together with historical data, for each lane center point of a respective lane and the category the vehicle is associated with, an average speed, and average offset, an average yaw, and an average yaw rate for the respective lane.

In some embodiments, the workflow 1200 includes a data storage step 1230. For example, the data that is collected and/or determined (in steps 1210 and 1220) can be stored locally (e.g., in the memory 606) or in the cloud (e.g., in database(s) 340).

In some embodiments, the workflow 1200 includes a data transmission step 1240. For example, after an autonomous vehicle (e.g., vehicle 102-X) establishes a handshake with the installation 130 and approaches the installation 130, the installation 130 (e.g., via CPU(s) 602) is configured to send runtime messages that include status of longitudinal points 1106 ahead of the vehicle. In some embodiments, the runtime messages are sent via a wireless communication network such as a 3G, 4G, or 5G network. In some embodiments, longitudinal points 1106-1 to 1106-3 can be within a predefined distance ahead of the vehicles, such as 200 meters, 500 meters, or 1000 meters. In some embodiments, the runtime messages are sent at a frequency such as 1 Hz, 2 Hz, 5 Hz, or 10 Hz.

In some embodiments, the workflow 1200 includes an autonomous vehicle decision step 1250 that is performed by one or more processors (e.g., CPU(s) 202) of a vehicle 102. In an example, machine learning models 250 applied by the vehicle 102 includes a steering model, and the steering model is applied to process sensor data, categorization data, and/or average motion data (e.g., speed, offset, yaw, yaw rate) and generate instructions to control the vehicle control system 290 (FIG. 2). In some embodiments, the steering model includes a plurality of modes corresponding to different road and traffic conditions.

In some embodiments, the vehicle 102 is configured to use the received messages as a reference for steering model optimization. For instance, if the messages indicate that a curvature of an upcoming segment of the road is sharp and an average offset of passing vehicles are large, it may be indicative that the vehicle may hit a lane boundary if it applies a less aggressive steering model. In this situation, the vehicle can decide to adjust the steering model to a more aggressive mode (e.g., a tracking-based mode) before entering the sharp curve, so that the vehicle stays in the middle of its lane to keep its distance from other vehicles and/or the lane boundary. In some instances, after the vehicle has passed the curve and the message shows the segment of the road ahead is straight, the vehicle 102 may revert to using a less aggressive mode (e.g., a stability-based mode) to avoid oscillations.

In an exemplary scenario, an autonomous vehicle approaches an installation, passing a longitudinal position that is located at a distance of 5,000 m ahead of the vehicle). the vehicle is traveling at the rightmost lane (e.g., lane ID=0), has a speed of 50 mph, and a lateral offset of 0.3 m. There exists a left curve in front. the vehicle receives the status of points 200 m ahead in the ego lane (e.g., lane ID=0). The vehicle determines (e.g., based on onboard sensors 260) that there is a truck at its left lane (e.g., lane ID=1). In the received data from the processors of the installation 130, the category associated with vehicles in the left lane matches the current situation. The data in this category (e.g., category 1160-2, corresponding to "other vehicles exist in left neighbor lane") shows that the ego vehicles would do insufficient left turn increasing lateral offset to 0.8 m such that they would keep a little farther from the vehicles on the left side. The vehicle thus decides to relax the parameters in its steering model (e.g., by operating in a stability-based mode) to pass the left curve.

Figure 13A:
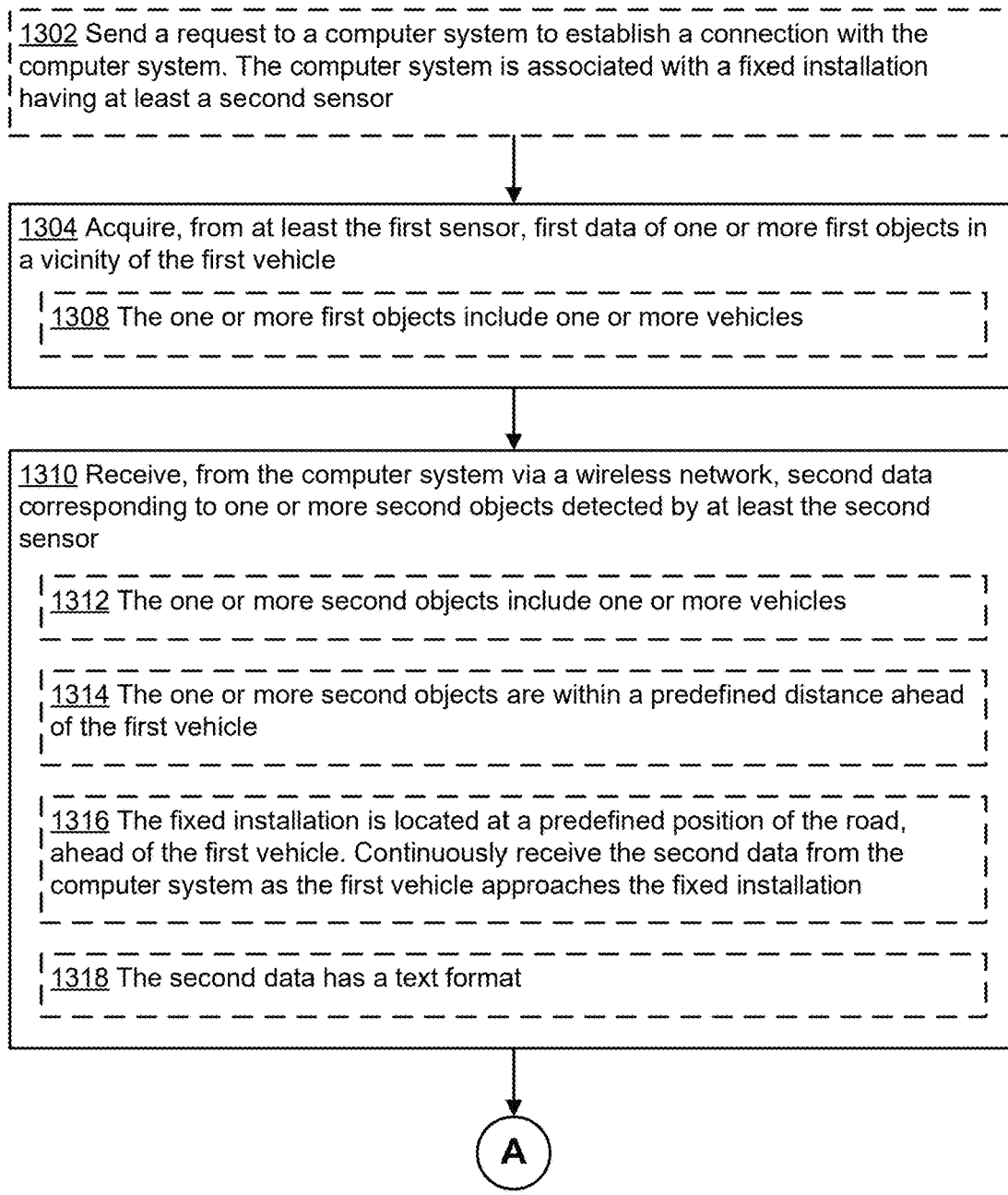
Figure 13B:
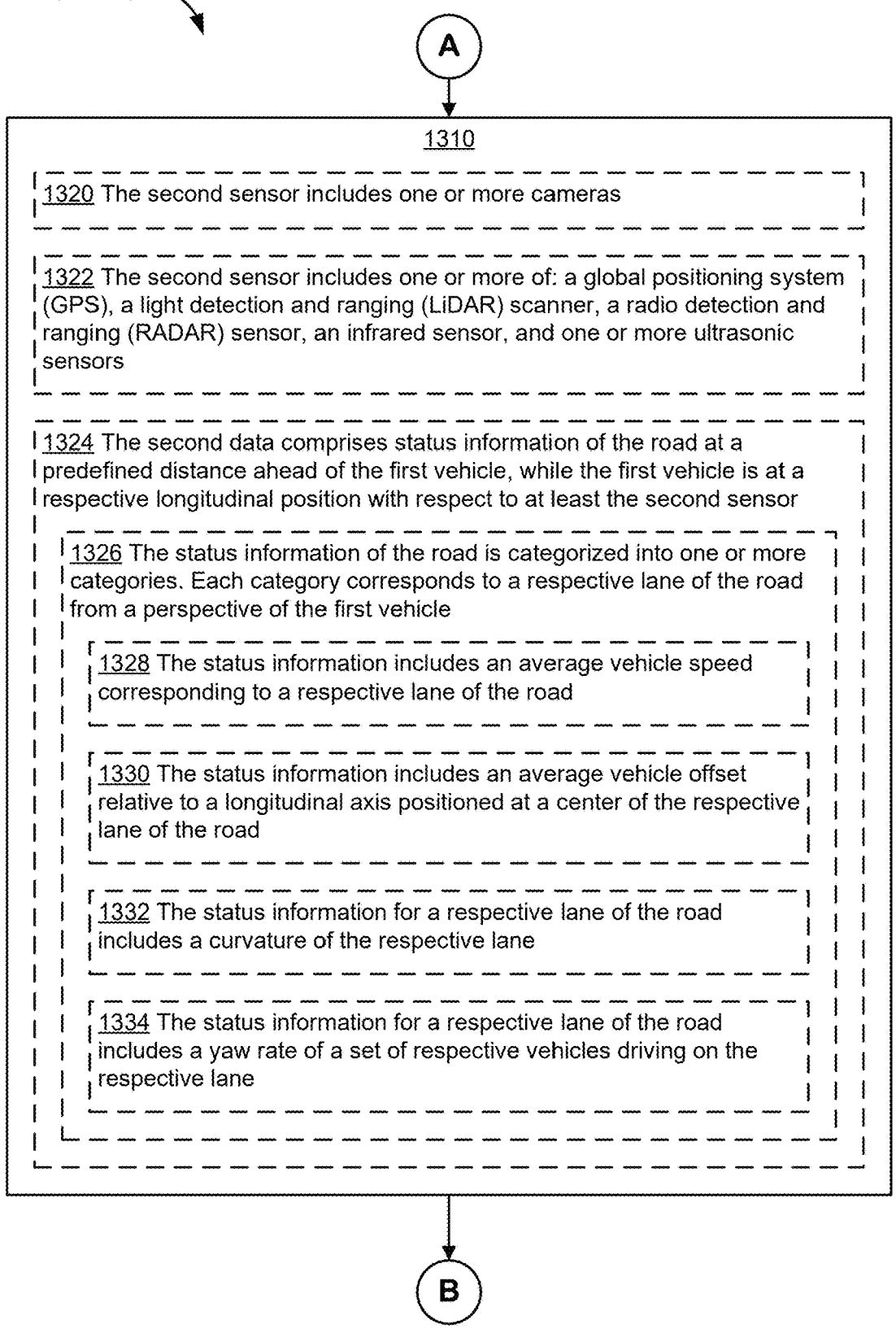

FIGS. 13A to 13C provide a flowchart of an example process for vehicle steering control, in accordance with some embodiments. The method 1300 is performed at a first vehicle (e.g., vehicle 102) (e.g., an ego vehicle, such as vehicle 102-X) traveling along a first lane (e.g., lane 1104) of a road (e.g., road 1102). The first vehicle includes at least a first sensor (e.g., sensors 260), one or more processors (e.g., CPU(s) 202), and memory (e.g., memory 206). In some embodiments, the memory stores one or more programs or instructions configured for execution by the one or more processors. In some embodiments, the instructions include instructions for at least partially autonomously driving the first vehicle. In some embodiments, the operations shown in FIGS. 1, 2, 4, 5A, 5B, 6, 7, 8, 9, 10, 11A, 11B, and 12 correspond to instructions stored in the memory or other non-transitory computer-readable storage medium. The computer-readable storage medium may include a magnetic or optical disk storage device, solid state storage devices such as Flash memory, or other non-volatile memory device or devices. In some embodiments, the instructions stored on the computer-readable storage medium include one or more of: source code, assembly language code, object code, or other instruction format that is interpreted by one or more processors. Some operations in the method 1300 may be combined and/or the order of some operations may be changed.

In some embodiments, the first vehicle sends a request (e.g., a handshake) to a computer system (e.g., computer system 600) to establish a connection with the computer system. In some embodiments, the first vehicle sends the request to the computer system via a wireless communication network (e.g., a 3G/4G/5G network that is connected to a wireless carrier). In some embodiments, the request includes a "handshake request" that enables the first vehicle to establish a secure connection with the computer system.

In some embodiments, the computer system is associated with a fixed (e.g., immovable) installation (e.g., installation 130) at the road. The fixed installation is located at a fixed position on the road, ahead of the first vehicle, and the first vehicle is travelling in a direction toward the fixed installation. This is illustrated in FIG. 11A.

In some embodiments, the fixed installation includes at least a second sensor (e.g., sensors 660). In some embodiments, the computer system is physically co-located at the fixed installation and data collected by the at least the second sensor is processed locally at the fixed installation. For example, the computer system includes a microcontroller chip that is at located locally at the fixed installation. In some embodiments, the computer system includes a cloud computer system that is located remotely from, and communicatively coupled with, the fixed installation. In some embodiments, data collected by the at least the second sensor is processed at the computer system, remotely from the fixed installation. In some embodiments, the computer system includes one or more (e.g., at least one or at least two) distinct systems located at distinct locations of the road. In one example, there may be multiple systems along the same road, each system including an installation having its own respective sensors 660 and/or processing capabilities. In another example, multiple systems may be located at different roads. For instance, a first system may be located at an on-ramp segment of a freeway and a second system may be located at a road junction; or a first system may be located at a toll booth in a first city and a second system may be located at another toll booth in a second city. via a wireless network.

The first vehicle acquires (1302), from the at least the first sensor (e.g., sensors 260), first data of one or more first objects in a vicinity of the first vehicle.

In some embodiments, the one or more first objects include (1308) one or more vehicles (e.g., vehicles 102).

The first vehicle receives (1310), from the computer system via the wireless network, second data corresponding to one or more second objects detected by at least the second sensor. In some embodiments, the one or more second objects detected by the at least second sensor are beyond a sensing range of the at least the first sensor of the first vehicle.

In some embodiments, the one or more second objects include (1312) one or more vehicles.

In some embodiments, the one or more second objects are (1314) within a predefined distance (e.g., 200 meters, 500 meters, 1000 meters, or 5000 meters) ahead of the first vehicle. In some embodiments, the predefined distance ahead of the first vehicle corresponds to the optional field "end_s" in the message 900. In some embodiments, the one or more second objects are beyond a sensing range of the at least the first sensor (e.g., sensors 260) of the first vehicle.

In some embodiments, the fixed installation is located at a predefined location at the road position of the road, ahead of the first vehicle. For example, the fixed installation is located in the direction that the first vehicle is traveling (e.g., the first vehicle is traveling toward the direction of the fixed installation, as illustrated in FIG. 11B). In some embodiments, the first vehicle continuously receives (1316) the second data from the computer system as the first vehicle approaches the fixed installation. For example, the first vehicle can continuously receive the second data from the computer system at a predefined frequency, such as 1 Hz (e.g., every 1 second), 5 Hz (e.g., every 0.2 second), or 10 Hz (e.g., every 0.1 second).

In some embodiments, the second data has (1318) a text format. For example, in some embodiments, the first vehicle receives the second data in GRPC format, which is a "lightweight" format that does not have images. gRPC enables more efficient data serialization and reduced latency. Because of the lightweight format of the data, the first vehicle can continuously receive the second data (e.g., at every 0.1 sec, 0.2 sec, 0.5 second or 1 sec) without overloading the system.

With continued reference to FIG. 13B, in some embodiments, the second sensor includes (1320) one or more cameras (e.g., cameras 666) (e.g., an imaging sensor).

In some embodiments, the second sensor includes one or more of: a global positioning system (GPS) (e.g., GPS 662), a light detection and ranging (LiDAR) scanner (e.g., LiDAR 664), a radio detection and ranging (RADAR) sensor (e.g., Radar 668), an infrared sensor (e.g., infrared sensors 670), and one or more ultrasonic sensors (e.g., ultrasonic sensors 672).

In some embodiments, the second data include (1324) status information of the road at an associated distance ahead of the first vehicle (e.g., at 100 m, 200 m, or 300 m ahead of the first vehicle), while the first vehicle is at a respective longitudinal position with respect to at least the second sensor. In some embodiments, the longitudinal position refers to a fixed position on a road with respect to the installation 130. In some embodiments, the longitudinal position is defined by (x,y) coordinates on a global coordinate system and a radius (R) for a region of interest for which sensor coverage exists. In some embodiments, the one or more processors (e.g., CPU(s) 202) of the first vehicle 102 or the one or more processors (e.g., CPU(s) 602) of the installation 130 are configured to translate the fixed position to a relative position with respect to the first vehicle 102 (e.g., 200 m ahead of the first vehicle 102), and use the information regarding the relative position to modify a steering behavior (e.g., steering precision) of the first vehicle 102. In some embodiments, the relative position specifies a region of interest and when it falls within a predefined (e.g., fixed) distance of the installation, the installation 130 (e.g., via CPU(s) 602) transmits (e.g., to the first vehicle 102 or other vehicles) information regarding this "longitudinal position."

In some embodiments, the status information of the road is categorized (1326) into one or more categories (e.g., categories 1160). Each category corresponds to a respective lane of the road (e.g., a respective neighboring lane of the road) from a perspective of the first vehicle. For example, in some embodiments, the one or more categories can include: a category for "no vehicle in neighbor lane" (e.g., category 1160-1), a category for "vehicle exiting in left neighbor lane" (e.g., category 1160-2), a category for "vehicle exiting in right neighbor lane" (e.g., category 1160-3), or a category for "vehicle exiting in both neighbor lanes" (e.g., category 1160-4), as illustrated in FIGS. 11A and 11B.

In some embodiments, the status information includes (1328) an average vehicle speed corresponding to a respective lane of the road. For example, in some embodiments, the average vehicle speed is computed by the computer system based on data corresponding to the one or more second objects detected by the at least second sensor, as well as historical data of vehicles that have traveled on the respective lane. See, e.g., computation process 1224 in FIG. 12.

In some embodiments, the status information includes (1330) an average vehicle offset (e.g., a lateral offset) relative to a longitudinal axis positioned at a center of the respective lane of the road. For example, in some embodiments, the average vehicle offset is computed by the computer system based on data corresponding to the one or more objects detected by the at least second sensor, as well as historical data of vehicles that have traveled on the respective lane. See, e.g., computation process 1224 in FIG. 12.

In some embodiments, the status information for a respective lane of the road includes (1332) a curvature of the respective lane.

In some embodiments, the status information for a respective lane of the road includes (1334) a yaw rate (e.g., a lateral rotation, rotation of y-axis of vehicle. The yaw of the lane is a measure of the curvature of the respective lane) of a set of respective vehicles driving on the respective lane.

Referring to FIG. 13C, in some embodiments, the one or more processors of the first vehicle adjusts (1336) a steering behavior of the first vehicle according to the first data and the second data. For example, in some embodiments, the one or more processors of the first vehicle adjust the steering behavior of the first vehicle to improve the steering accuracy of the vehicle within the same lane of travel. In some embodiments, the one or more processors of the first vehicle adjust the steering behavior of the first vehicle to manage a lateral offset of the vehicle with respect to its lane of travel.

In some embodiments, adjusting the steering behavior of the first vehicle according to the first data and the second data includes determining (1338), from the one or more categories of the status information, a first category of the status information that matches the first data of the one or more vehicles acquired from at least the first sensor.

In some embodiments, adjusting the steering behavior of the first vehicle includes controlling (1340) a steering control model of the first vehicle to at least partially autonomously drive the first vehicle in a tracking-based mode or a stability-based mode. For example, in some embodiments, the first vehicle includes a steering control model that is configured to operate in a tracking-based mode, which maintains the lateral offset to as close to zero as possible and forces the first vehicle to stay in the middle of its lane to keep its distance from other vehicles in neighboring lanes. In some embodiments, the steering control model is configured to operate in a stability-based mode, which permits the first vehicle to deviate from the middle of its lane in order to provide a smoother ride.

In some embodiments, adjusting the steering behavior of the first vehicle includes modifying (1342) a parameter of a steering model of the first vehicle.

The first vehicle at least partially autonomously drives (1344) the first vehicle in a first trajectory along the first lane of the road (e.g., in the same lane) according to the steering behavior of the first vehicle.

In some embodiments, the first vehicle is configured (1346) to at least partially autonomously drive the first vehicle in the first trajectory in accordance with a determination, by the first vehicle, that the first vehicle can track the first travel trajectory.

In some embodiments, the first vehicle, in accordance with a determination that the first vehicle cannot track the first travel trajectory, rejects (1348) the first travel trajectory and controls the first vehicle to at least partially autonomously drive the first vehicle according to a second travel trajectory that is different from the first travel trajectory.

In some embodiments, at least partially autonomously driving the first vehicle according to the second travel trajectory includes switching (1350), by the first vehicle, from a first lane of the road to a second lane of the road.

Turning on to some example embodiments:

(A1) In accordance with some embodiments, a method for steering control is performed at a first vehicle traveling along a first lane of a road. The first vehicle includes at least a first sensor, one or more processors, and memory storing instructions for at least partially autonomously driving the first vehicle. The method includes (i) acquiring, from at least the first sensor, first data of one or more first objects in a vicinity of the first vehicle; (ii) receiving, from a computer system associated with a fixed installation having at least a second sensor, via a wireless network, second data corresponding to one or more second objects detected by at least the second sensor; (iii) adjusting, by the one or more processors, a steering behavior of the first vehicle according to the first data and the second data; and (iv) at least partially autonomously driving the first vehicle in a first trajectory along the first lane of the road according to the steering behavior of the first vehicle.

(A2) In some embodiments of A1, the method includes prior to acquiring, from at least the first sensor, the first data of one or more objects, sending a request to the computer system to establish a connection with the computer system.

(A3) In some embodiments of A1 or A2, the one or more second objects are within a predefined distance ahead of the first vehicle.

(A4) In some embodiments of any of A1-A3, the one or more first objects include one or more vehicles (A5) In some embodiments of any of A1-A4, the one or more second objects include one or more vehicles.

(A6) In some embodiments of any of A1-A5, the fixed installation is located at a predefined position of the road, ahead of the first vehicle. The second data are continuously received from the computer system as the first vehicle approaches the fixed installation.

(A7) In some embodiments of any of A1-A6, the second data include status information of the road at an associated distance ahead of the first vehicle, while the first vehicle is at a respective longitudinal position with respect to at least the second sensor.

(A8) In some embodiments of A7, the status information of the road is categorized into one or more categories, each category corresponding to a respective lane of the road from a perspective of the first vehicle.

(A9) In some embodiments of A8, the status information includes an average vehicle speed corresponding to a respective lane of the road and an average vehicle offset relative to a longitudinal axis positioned at a center of the respective lane of the road.

(A10) In some embodiments of A8 or A9, the status information for a respective lane of the road includes at least one of: a curvature of the respective lane and a yaw rate of a set of respective vehicles driving on the respective lane.

(A11) In some embodiments of any of A8-A10, adjusting the steering behavior of the first vehicle according to the first data and the second data includes determining, from the one or more categories of the status information, a first category of the status information that matches the first data of the one or more vehicles acquired from at least the first sensor.

(A12) In some embodiments of any of A1-A11, the second data has a text format.

(A13) In some embodiments of any of A1-A12, adjusting the steering behavior of the first vehicle includes controlling a steering control model of the first vehicle to at least partially autonomously drive the first vehicle in a tracking-based mode or a stability-based mode.

(A14) In some embodiments of any of A1-A13, adjusting the steering behavior of the first vehicle includes modifying a parameter of a steering model of the first vehicle.

(A15) In some embodiments of any of A1-A14, the second sensor includes one or more cameras.

(A16) In some embodiments of any of A1-A15, the second sensor includes one or more of: a global positioning system (GPS), a light detection and ranging (LiDAR) scanner, one or more cameras, a radio detection and ranging (RADAR) sensor, an infrared sensor, and one or more ultrasonic sensors.

(A17) In some embodiments of any of A1-A16, the first vehicle is configured to at least partially autonomously drive the first vehicle in the first trajectory in accordance with a determination, by the first vehicle, that the first vehicle can track the first travel trajectory.

(A18) In some embodiments of A17, the method includes, in accordance with a determination that the first vehicle cannot track the first travel trajectory: rejecting the first travel trajectory and controlling the first vehicle to at least partially autonomously drive the first vehicle according to a second travel trajectory that is different from the first travel trajectory.

(A19) In some embodiments of A18, at least partially autonomously driving the first vehicle according to the second travel trajectory includes switching from a first lane of the road to a second lane of the road.

(B1) In accordance with some embodiments, a vehicle includes at least a first sensor, a vehicle control system, one or more processors, and memory coupled to the one or more processors. The memory stores instructions that, when executed by the one or more processors, cause the computer system to perform the method of any of A1-A19.

(C1) In accordance with some embodiments, a non-transitory computer-readable storage medium stores instructions that are configured for execution by one or more processors of a first vehicle, the first vehicle further including at least a first sensor and a vehicle control system. The instructions, when executed by the one or more processors, cause the first vehicle to perform the method of any of A1-A19.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for vehicle steering control, comprising:
   at a first vehicle traveling along a first lane of a road, the first vehicle including at least a first sensor, one or more processors, and memory storing instructions for at least partially autonomously driving the first vehicle:
   acquiring, from at least the first sensor, first data of one or more first objects in a vicinity of the first vehicle;
   receiving, from a computer system associated with a fixed installation situated at a stationary location along the road and having at least a second sensor, via a wireless network, second data corresponding to one or more second objects detected by at least the second sensor;
   adjusting, by the one or more processors, a steering behavior of the first vehicle according to the first data and the second data; and
   at least partially autonomously driving the first vehicle in a first trajectory along the first lane of the road according to the steering behavior of the first vehicle.

2. The method of claim 1, further comprising:
   prior to acquiring, from at least the first sensor, the first data of one or more first objects, sending a request to the computer system to establish a connection with the computer system.

3. The method of claim 1, wherein the one or more second objects are within a predefined distance ahead of the first vehicle.

4. The method of claim 1, wherein the one or more first objects include one or more vehicles.

5. The method of claim 1, wherein the one or more second objects include one or more vehicles.

6. The method of claim 1, wherein:
   the fixed installation is located at a predefined position of the road, ahead of the first vehicle; and
   the second data are continuously received from the computer system as the first vehicle approaches the fixed installation.

7. The method of claim 1, wherein the second data include status information of the road at an associated distance ahead of the first vehicle, while the first vehicle is at a respective longitudinal position with respect to at least the second sensor.

8. The method of claim 7, wherein the status information of the road is categorized into one or more categories, each category corresponding to a respective lane of the road from a perspective of the first vehicle.

9. The method of claim 8, wherein the status information includes:
   an average vehicle speed corresponding to a respective lane of the road; and
   an average vehicle offset relative to a longitudinal axis positioned at a center of the respective lane of the road.

10. The method of claim 8, wherein the status information for a respective lane of the road includes one or both of:
    a curvature of the respective lane; and
    a yaw rate of a set of respective vehicles driving on the respective lane.

11. The method of claim 8, wherein adjusting the steering behavior of the first vehicle according to the first data and the second data includes:
    determining, from the one or more categories of the status information, a first category of the status information that matches the first data of the one or more vehicles acquired from at least the first sensor.

12. The method of claim 1, wherein the second data has a text format.

13. A first vehicle traveling along a first lane of a road, the first vehicle comprising:
    at least a first sensor;
    one or more processors; and
    memory storing one or more programs configured for execution by the one or more processors, the one or more programs comprising instructions for:
        acquiring, from at least the first sensor, first data of one or more first objects in a vicinity of the first vehicle;
        receiving, from a computer system associated with a fixed installation situated at a stationary location along the road and having at least a second sensor, via a wireless network, second data corresponding to one or more second objects detected by at least the second sensor;
        adjusting, by the one or more processors, a steering behavior of the first vehicle according to the first data and the second data; and
        at least partially autonomously driving the first vehicle in a first trajectory along the first lane of the road according to the steering behavior of the first vehicle.

14. The first vehicle of claim 13, wherein the instructions for adjusting the steering behavior of the first vehicle include instructions for:
    controlling a steering control model of the first vehicle to at least partially autonomously drive the first vehicle in a tracking-based mode or a stability-based mode.

15. The first vehicle of claim 13, wherein the instructions for adjusting the steering behavior of the first vehicle include instructions for modifying a parameter of a steering model of the first vehicle.

16. The first vehicle of claim 13, the one or more programs including instructions for:
    prior to acquiring, from at least the first sensor, the first data of one or more objects, sending a request to the computer system to establish a connection with the computer system.

17. A non-transitory computer-readable storage medium storing one or more programs configured for execution by one or more processors of a first vehicle that is traveling along a first lane of a road, the first vehicle further including at least a first sensor, the one or more programs comprising instructions for:
    acquiring, from at least the first sensor, first data of one or more first objects in a vicinity of the first vehicle;
    receiving, from a computer system associated with a fixed installation situated at a stationary location along the road and having at least a second sensor, via a wireless network, second data corresponding to one or more second objects detected by at least the second sensor;
    adjusting, by the one or more processors, a steering behavior of the first vehicle according to the first data and the second data; and
    at least partially autonomously driving the first vehicle in a first trajectory along the first lane of the road according to the steering behavior of the first vehicle.

18. The non-transitory computer-readable storage medium of claim 17, wherein the second sensor includes one or more cameras.

19. The non-transitory computer-readable storage medium of claim 17, wherein the second sensor includes one or more of: a global positioning system (GPS), a light detection and ranging (LiDAR) scanner, one or more cameras, a radio detection and ranging (RADAR) sensor, an infrared sensor, and one or more ultrasonic sensors.

20. The non-transitory computer-readable storage medium of claim 17, wherein:
    the one or more first objects include one or more vehicles; and/or the one or more second objects include one or more vehicles.

* * * * *